US009561905B2

(12) United States Patent
Toebes et al.

(10) Patent No.: US 9,561,905 B2
(45) Date of Patent: Feb. 7, 2017

(54) AUTONOMOUS TRANSPORT VEHICLE

(75) Inventors: Stephen C. Toebes, Sunderland, MA (US); Justin Holwell, Sterling, MA (US)

(73) Assignee: SYMBOTIC, LLC, Wilmington, MA (US)

( * ) Notice: Subject to any disclaimer, the term of this patent is extended or adjusted under 35 U.S.C. 154(b) by 518 days.

(21) Appl. No.: 13/326,423

(22) Filed: Dec. 15, 2011

(65) Prior Publication Data
US 2012/0189409 A1 Jul. 26, 2012

Related U.S. Application Data

(60) Provisional application No. 61/423,409, filed on Dec. 15, 2010.

(51) Int. Cl.
B65G 1/04 (2006.01)
(52) U.S. Cl.
CPC .................................. B65G 1/0492 (2013.01)
(58) Field of Classification Search
CPC .................................................... B65G 1/0492
USPC ........... 414/273, 401, 402; 180/168; 701/25; 364/424
See application file for complete search history.

(56) References Cited

U.S. PATENT DOCUMENTS

| | | |
|---|---|---|
| 1,845,962 A | 2/1932 | Dorr |
| 1,887,667 A | 11/1932 | Wheeler |
| 2,606,508 A | 8/1952 | Nes |
| 2,656,995 A | 10/1953 | Wolf |
| 2,673,689 A | 3/1954 | Bonanno |
| 2,792,234 A | 5/1957 | Page |
| 2,840,248 A | 6/1958 | Grove et al. |
| 2,877,575 A | 3/1959 | Stedt |
| 2,923,421 A | 2/1960 | De Senigon De Roumefort |
| 2,945,604 A | 7/1960 | Kroll et al. |
| 2,996,621 A | 8/1961 | Barrett, Jr. |
| 3,161,303 A | 12/1964 | Burrows |
| 3,162,459 A | 12/1964 | Marmorine et al. |
| 3,269,744 A | 8/1966 | Dobson |
| 3,369,648 A | 2/1968 | Weintz |
| 3,519,149 A | 7/1970 | Saul |
| 3,554,390 A | 1/1971 | Saul |
| 3,636,586 A | 1/1972 | Bollinger et al. |

(Continued)

FOREIGN PATENT DOCUMENTS

| | | |
|---|---|---|
| DE | 4104527 | 8/1992 |
| DE | 10142395 | 11/2002 |

(Continued)

*Primary Examiner* — Jonathan Snelting
(74) *Attorney, Agent, or Firm* — Perman & Green, LLP

(57) ABSTRACT

An autonomous transport vehicle including a frame having a longitudinal axis extending from a front of the frame to a back of the frame, at least one first guide member mounted on one side of the frame and having a first guide member frame of reference, and at least one second guide member mounted to an opposite side of the frame than the at least one first guide member and having a second guide member frame of reference, wherein the first and second guide members are asymmetrically compliant guide members so that a stiffness of the at least one first guide member in response to a force in a predetermined direction relative to the first guide member frame of reference is different than a stiffness of the at least second guide member in response to the force in the predetermined direction relative to the second guide member frame of reference.

20 Claims, 8 Drawing Sheets

(56) References Cited

U.S. PATENT DOCUMENTS

| | | |
|---|---|---|
| 3,677,421 A | 7/1972 | Kintner |
| 3,737,056 A | 6/1973 | Hathcock, Jr. |
| 3,738,506 A | 6/1973 | Cornford et al. |
| 3,744,945 A | 7/1973 | Metrailer |
| 3,746,189 A | 7/1973 | Burch et al. |
| 3,751,758 A | 8/1973 | Highee et al. |
| 3,782,565 A | 1/1974 | Doran et al. |
| 3,802,580 A | 4/1974 | Castaldi |
| 3,850,111 A | 11/1974 | Hansen |
| 3,876,087 A | 4/1975 | Osta |
| 3,876,095 A | 4/1975 | Stedt |
| 3,896,955 A | 7/1975 | Collins et al. |
| 3,904,216 A | 9/1975 | Metrailer |
| 3,940,105 A | 2/1976 | Metrailer |
| 3,970,840 A | 7/1976 | De Bruine |
| 3,976,302 A | 8/1976 | Hammarstrand |
| 3,984,012 A | 10/1976 | Ennis et al. |
| 4,007,843 A | 2/1977 | Lubbers et al. |
| 4,026,365 A | 5/1977 | Anderson et al. |
| 4,037,291 A | 7/1977 | Huempfner et al. |
| 4,057,019 A | 11/1977 | Shaffer |
| 4,064,986 A | 12/1977 | Bertovich |
| 4,072,203 A | 2/1978 | Pierson |
| 4,079,955 A | 3/1978 | Thorpe et al. |
| 4,087,116 A | 5/1978 | Morimoto |
| 4,174,854 A | 11/1979 | Spicka et al. |
| 4,183,304 A | 1/1980 | Furster |
| 4,213,396 A | 7/1980 | Mehren et al. |
| 4,219,296 A | 8/1980 | Fujii et al. |
| 4,223,611 A | 9/1980 | Dawson et al. |
| 4,265,582 A | 5/1981 | Theobald |
| 4,268,207 A | 5/1981 | Pipes |
| 4,271,764 A | 6/1981 | Braun et al. |
| 4,273,234 A | 6/1981 | Bourgeois |
| 4,307,988 A | 12/1981 | Page et al. |
| 4,346,659 A | 8/1982 | Binder |
| 4,349,937 A | 9/1982 | Fontana |
| 4,349,938 A | 9/1982 | Fontana |
| 4,353,572 A | 10/1982 | McCain |
| 4,372,219 A | 2/1983 | Gibbs |
| 4,372,724 A | 2/1983 | Stolzer |
| 4,394,104 A | 7/1983 | Camerini et al. |
| 4,395,181 A | 7/1983 | Loomer |
| 4,406,570 A | 9/1983 | Duncan et al. |
| 4,428,708 A | 1/1984 | Burt |
| 4,445,440 A | 5/1984 | Geiss |
| 4,459,078 A | 7/1984 | Chiantella et al. |
| 4,470,742 A | 9/1984 | Schindler |
| 4,492,504 A | 1/1985 | Hainsworth |
| 4,505,630 A | 3/1985 | Kaschner et al. |
| 4,527,486 A | 7/1985 | Baird et al. |
| 4,538,950 A | 9/1985 | Shiomi et al. |
| 4,678,390 A | 7/1987 | Bonneton et al. |
| 4,679,149 A | 7/1987 | Merz |
| 4,715,662 A | 12/1987 | van Zanten et al. |
| 4,716,530 A | 12/1987 | Ogawa et al. |
| 4,726,725 A | 2/1988 | Baker et al. |
| 4,733,740 A | 3/1988 | Bigowsky et al. |
| 4,750,429 A | 6/1988 | Mordaunt et al. |
| 4,773,807 A | 9/1988 | Kroll et al. |
| 4,786,229 A | 11/1988 | Henderson |
| 4,811,229 A | 3/1989 | Wilson |
| 4,812,985 A | 3/1989 | Hambrick et al. |
| 4,856,956 A | 8/1989 | Zur |
| 4,878,876 A | 11/1989 | Ishimoto |
| 4,883,401 A | 11/1989 | Kavlieff |
| 4,887,016 A | 12/1989 | Malick |
| 4,905,783 A | 3/1990 | Bober |
| 4,909,697 A | 3/1990 | Bernard, II et al. |
| 4,936,738 A | 6/1990 | Brennan et al. |
| 4,966,242 A | 10/1990 | Baillargeon |
| 4,966,513 A | 10/1990 | Motoda |
| 4,993,905 A | 2/1991 | Potocnjak |
| 5,002,449 A | 3/1991 | Kita et al. |
| 5,004,399 A | 4/1991 | Sullivan et al. |
| 5,015,145 A | 5/1991 | Angell et al. |
| 5,061,607 A | 10/1991 | Walls |
| 5,069,592 A | 12/1991 | Galperin |
| 5,096,355 A | 3/1992 | Schroder |
| 5,134,353 A | 7/1992 | Kita et al. |
| 5,134,940 A | 8/1992 | Fujita et al. |
| 5,135,344 A | 8/1992 | Kita et al. |
| 5,140,787 A | 8/1992 | Corcoran |
| 5,149,654 A | 9/1992 | Gross et al. |
| 5,156,639 A | 10/1992 | Bostrom |
| 5,168,815 A | 12/1992 | Comer et al. |
| 5,179,329 A | 1/1993 | Nishikawa et al. |
| 5,187,664 A | 2/1993 | Yardley et al. |
| 5,199,840 A | 4/1993 | Castaldi et al. |
| 5,213,463 A | 5/1993 | Rothlisberger et al. |
| 5,218,909 A | 6/1993 | Ng |
| 5,219,264 A | 6/1993 | McClure et al. |
| 5,226,782 A | 7/1993 | Rigling |
| 5,238,100 A | 8/1993 | Rose, Jr. et al. |
| 5,265,944 A | 11/1993 | Gloceri |
| 5,271,703 A | 12/1993 | Lindqvist et al. |
| 5,273,392 A | 12/1993 | Bernard, II et al. |
| 5,281,901 A | 1/1994 | Yardley et al. |
| 5,286,157 A | 2/1994 | Vainio et al. |
| 5,307,888 A | 5/1994 | Urvoy |
| 5,327,354 A | 7/1994 | Tsujimoto |
| 5,328,316 A | 7/1994 | Hoffmann |
| 5,333,982 A | 8/1994 | Tanizawa |
| 5,333,983 A | 8/1994 | Hatouchi et al. |
| 5,337,880 A | 8/1994 | Claycomb et al. |
| 5,362,197 A | 11/1994 | Rigling |
| 5,370,492 A | 12/1994 | Gleyze et al. |
| 5,377,851 A | 1/1995 | Asano et al. |
| 5,379,229 A | 1/1995 | Parsons et al. |
| 5,380,139 A | 1/1995 | Pohjonen et al. |
| 5,388,955 A | 2/1995 | Schroder |
| 5,397,212 A | 3/1995 | Watanabe et al. |
| 5,403,147 A | 4/1995 | Tanaka |
| 5,405,232 A | 4/1995 | Lloyd et al. |
| 5,418,732 A | 5/1995 | McFadin |
| 5,421,685 A | 6/1995 | Elmer et al. |
| 5,421,697 A | 6/1995 | Ostwald |
| 5,425,612 A | 6/1995 | Ebstein |
| 5,434,490 A | 7/1995 | Ishida et al. |
| 5,445,485 A | 8/1995 | Poutet |
| 5,450,797 A | 9/1995 | Becker et al. |
| 5,460,476 A | 10/1995 | Gazza |
| 5,472,309 A | 12/1995 | Bernard, II et al. |
| 5,501,295 A | 3/1996 | Miiller et al. |
| 5,525,884 A | 6/1996 | Sugiura et al. |
| 5,529,165 A | 6/1996 | Shupert |
| 5,564,880 A | 10/1996 | Lederer |
| 5,588,796 A | 12/1996 | Ricco et al. |
| 5,601,395 A | 2/1997 | Lichti, Sr. et al. |
| 5,611,422 A | 3/1997 | Harkonen |
| 5,615,992 A | 4/1997 | Proske et al. |
| 5,626,362 A | 5/1997 | Mottola |
| 5,632,350 A | 5/1997 | Gauvin |
| 5,650,703 A | 7/1997 | Yardley et al. |
| 5,664,688 A | 9/1997 | Kitanaka et al. |
| 5,667,230 A | 9/1997 | Riley et al. |
| 5,668,724 A | 9/1997 | Ehret et al. |
| 5,707,199 A | 1/1998 | Faller |
| 5,718,322 A | 2/1998 | Mulhern |
| 5,718,551 A | 2/1998 | Ebstein |
| 5,725,063 A | 3/1998 | Ceragioli et al. |
| 5,743,562 A | 4/1998 | Mottola |
| 5,764,014 A | 6/1998 | Jakeway et al. |
| 5,801,506 A | 9/1998 | Netzler |
| 5,806,870 A | 9/1998 | Hull et al. |
| 5,810,540 A | 9/1998 | Castaldi |
| 5,829,096 A | 11/1998 | Perry |
| 5,833,431 A | 11/1998 | Rosse, III et al. |
| 5,839,872 A | 11/1998 | Goto et al. |
| 5,847,537 A | 12/1998 | Parmley, Sr. |
| 5,857,413 A | 1/1999 | Ward |
| 5,899,469 A | 5/1999 | Pinto et al. |
| 5,918,951 A | 7/1999 | Rudd, III |
| 5,927,926 A | 7/1999 | Yagi et al. |

(56) References Cited

U.S. PATENT DOCUMENTS

| | | |
|---|---|---|
| 5,928,058 A | 7/1999 | Francis et al. |
| 5,988,306 A | 11/1999 | Ooishi |
| 6,000,502 A | 12/1999 | Leasor et al. |
| 6,021,367 A | 2/2000 | Pilutti et al. |
| 6,024,381 A | 2/2000 | Mottola |
| 6,036,427 A | 3/2000 | Kita et al. |
| 6,038,501 A | 3/2000 | Kawakami |
| 6,061,607 A | 5/2000 | Bradley et al. |
| 6,062,942 A | 5/2000 | Ogihara |
| 6,116,842 A | 9/2000 | Harris et al. |
| 6,149,366 A | 11/2000 | Deandrea |
| 6,158,566 A | 12/2000 | Pollock |
| 6,220,676 B1 | 4/2001 | Rudd, III |
| 6,272,406 B2 | 8/2001 | Alofs et al. |
| 6,324,994 B1 | 12/2001 | Glenn |
| 6,325,586 B1 | 12/2001 | Loy |
| 6,341,269 B1 | 1/2002 | Dulaney et al. |
| 6,345,217 B1 | 2/2002 | Zeitler et al. |
| 6,352,035 B1 | 3/2002 | Kashiwase et al. |
| 6,354,430 B1 | 3/2002 | Oe |
| 6,360,673 B1 | 3/2002 | Herrin et al. |
| 6,389,981 B1 | 5/2002 | Strothmann et al. |
| 6,390,756 B1 | 5/2002 | Isaacs et al. |
| 6,391,226 B1 | 5/2002 | Chauvette et al. |
| 6,425,723 B1 | 7/2002 | Okada et al. |
| 6,439,131 B1 | 8/2002 | Higgins |
| 6,439,955 B1 | 8/2002 | Feketo |
| 6,503,043 B1 | 1/2003 | Smith et al. |
| 6,508,102 B1 | 1/2003 | Margolis et al. |
| 6,563,128 B2 | 5/2003 | Lublin et al. |
| 6,600,418 B2 | 7/2003 | Francis et al. |
| 6,601,435 B2 | 8/2003 | Hong |
| 6,629,502 B2 | 10/2003 | Matsukawa |
| 6,631,321 B1 | 10/2003 | Ciprian |
| 6,645,355 B2 | 11/2003 | Hanson et al. |
| 6,652,213 B1 | 11/2003 | Mitchell et al. |
| 6,655,297 B2 | 12/2003 | Kawato et al. |
| 6,692,211 B2 | 2/2004 | Yuyama et al. |
| 6,695,328 B2 | 2/2004 | Cope |
| 6,721,638 B2 | 4/2004 | Zeitler |
| 6,748,292 B2 | 6/2004 | Mountz |
| 6,763,767 B2 | 7/2004 | Jackson et al. |
| 6,808,058 B2 | 10/2004 | Shiohara |
| 6,851,921 B2 | 2/2005 | Haag |
| 6,861,154 B2 | 3/2005 | Olson et al. |
| 6,864,489 B2 | 3/2005 | Chen et al. |
| 6,880,202 B2 | 4/2005 | Thompson et al. |
| 6,928,336 B2 | 8/2005 | Peshkin et al. |
| 6,929,440 B1 | 8/2005 | Grond |
| 6,948,899 B2 | 9/2005 | Lee |
| 6,950,722 B2 | 9/2005 | Mountz |
| 6,988,451 B2 | 1/2006 | Marcotte et al. |
| 6,997,665 B2 | 2/2006 | Bouche et al. |
| 7,002,698 B2 | 2/2006 | Hanson et al. |
| 7,002,772 B2 | 2/2006 | Yardy |
| 7,003,375 B2 | 2/2006 | Inui |
| 7,008,164 B2 | 3/2006 | Rokkaku |
| 7,011,487 B2 | 3/2006 | Kafka et al. |
| 7,017,228 B2 | 3/2006 | Silverstein et al. |
| 7,025,191 B2 | 4/2006 | Lichti et al. |
| 7,074,151 B2 | 7/2006 | Thompson |
| 7,085,097 B2 | 8/2006 | Starr et al. |
| 7,100,294 B1 | 9/2006 | Goldsobel et al. |
| 7,101,139 B1 | 9/2006 | Benedict |
| 7,102,848 B2 | 9/2006 | Kumpon et al. |
| 7,110,855 B2 | 9/2006 | Leishman |
| 7,119,982 B2 | 10/2006 | Starr et al. |
| 7,128,196 B2 | 10/2006 | Oldford et al. |
| 7,128,521 B2 | 10/2006 | Hansl |
| 7,135,992 B2 | 11/2006 | Karlsson et al. |
| 7,137,593 B2 | 11/2006 | Baatz |
| 7,145,478 B2 | 12/2006 | Goncalves et al. |
| 7,145,747 B2 | 12/2006 | Brace et al. |
| 7,155,308 B2 | 12/2006 | Jones |
| 7,158,866 B2 | 1/2007 | Gustafsson et al. |
| 7,184,855 B2 | 2/2007 | Stingel, III et al. |
| 7,192,034 B2 | 3/2007 | Radke et al. |
| 7,221,998 B2 | 5/2007 | Brust et al. |
| 7,266,422 B1 | 9/2007 | DeMotte et al. |
| 7,319,320 B2 | 1/2008 | Kawashima et al. |
| 7,329,081 B2 | 2/2008 | Baker et al. |
| 7,381,022 B1 | 6/2008 | King |
| 7,386,379 B2 | 6/2008 | Naik et al. |
| 7,402,018 B2 | 7/2008 | Mountz et al. |
| 7,426,970 B2 | 9/2008 | Olsen |
| 7,433,759 B2 | 10/2008 | Nangoy |
| 7,495,561 B2 | 2/2009 | Bodin et al. |
| 7,506,404 B2 | 3/2009 | Block et al. |
| 7,520,376 B2 | 4/2009 | Bar |
| 7,536,283 B2 | 5/2009 | Potter et al. |
| 7,539,557 B2 | 5/2009 | Yamauchi |
| 7,584,812 B2 | 9/2009 | Radke et al. |
| 7,587,260 B2 | 9/2009 | Bruemmer et al. |
| 7,591,630 B2 | 9/2009 | Lert, Jr. |
| 7,620,477 B2 | 11/2009 | Bruemmer |
| 7,636,982 B2 | 12/2009 | Jones et al. |
| 7,641,014 B2 | 1/2010 | Hu |
| 7,648,002 B2 | 1/2010 | Easton et al. |
| 7,661,920 B2 | 2/2010 | Kantola et al. |
| 7,668,621 B2 | 2/2010 | Bruemmer |
| 7,671,293 B2 | 3/2010 | Fry et al. |
| 7,682,122 B2 | 3/2010 | Maynard et al. |
| 7,686,560 B2 | 3/2010 | Laurin et al. |
| 7,689,318 B2 | 3/2010 | Draper |
| 7,695,235 B1 | 4/2010 | Rallis |
| 7,730,781 B2 | 6/2010 | Zhang et al. |
| 7,751,928 B1 | 7/2010 | Antony et al. |
| 7,769,513 B2 | 8/2010 | Breed et al. |
| 7,771,152 B2 | 8/2010 | Waltersbacher |
| 7,792,350 B2 | 9/2010 | Kiley et al. |
| 7,793,742 B2 | 9/2010 | Donaldson et al. |
| 7,801,644 B2 | 9/2010 | Bruemmer et al. |
| 7,826,919 B2 | 11/2010 | D'Andrea et al. |
| 7,826,926 B2 | 11/2010 | Myeung et al. |
| 7,861,844 B2 | 1/2011 | Hayduchok et al. |
| 7,866,671 B2 | 1/2011 | Madler |
| 7,885,750 B2 | 2/2011 | Lu |
| 7,909,562 B2 | 3/2011 | Mead |
| 7,926,145 B2 | 4/2011 | Liao |
| 7,931,431 B2 | 4/2011 | Benedict et al. |
| 7,960,973 B2 | 6/2011 | Zeller et al. |
| 7,965,871 B2 | 6/2011 | Ihara et al. |
| 7,967,354 B2 | 6/2011 | Faulkner et al. |
| 7,974,738 B2 | 7/2011 | Bruemmer et al. |
| 7,991,505 B2 | 8/2011 | Lert, Jr. et al. |
| 8,000,835 B2 | 8/2011 | Friz et al. |
| 8,001,837 B2 | 8/2011 | Larson et al. |
| 8,006,824 B2 | 8/2011 | Wada et al. |
| 8,007,221 B1 | 8/2011 | More et al. |
| 8,024,066 B2 | 9/2011 | Reverte et al. |
| 8,031,086 B2 | 10/2011 | Thacher et al. |
| 8,041,456 B1 | 10/2011 | Blackwell et al. |
| 8,042,627 B2 | 10/2011 | Yang et al. |
| 8,060,257 B2 | 11/2011 | Close et al. |
| 3,370,492 A1 | 12/2011 | Gleyze |
| 8,136,650 B2 | 3/2012 | Frich et al. |
| 8,280,548 B2 | 10/2012 | Zuber |
| 8,364,309 B1 | 1/2013 | Bailey |
| 8,378,825 B2 | 2/2013 | Dahms et al. |
| 8,425,173 B2 | 4/2013 | Lert et al. |
| 8,480,347 B2 | 7/2013 | Schafer |
| 8,515,575 B2 | 8/2013 | Pfeiffer |
| 8,594,835 B2 | 11/2013 | Lert et al. |
| 9,020,639 B2 | 4/2015 | Bewley et al. |
| 9,037,286 B2 | 5/2015 | Lert |
| 2002/0029719 A1 | 3/2002 | Matsukawa |
| 2002/0037208 A1 | 3/2002 | Patrito |
| 2002/0076307 A1 | 6/2002 | Fallin et al. |
| 2003/0033217 A1 | 2/2003 | Cutlip |
| 2003/0051544 A1 | 3/2003 | Hong |
| 2003/0074125 A1 | 4/2003 | Walenty et al. |
| 2003/0185656 A1 | 10/2003 | Hansl |
| 2003/0200129 A1 | 10/2003 | Klaubauf et al. |
| 2004/0093116 A1 | 5/2004 | Mountz |

(56) References Cited

U.S. PATENT DOCUMENTS

| | | |
|---|---|---|
| 2004/0136821 A1 | 7/2004 | Berger et al. |
| 2004/0167667 A1 | 8/2004 | Goncalves et al. |
| 2004/0238326 A1 | 12/2004 | Lichti |
| 2005/0029029 A1 | 2/2005 | Thorne |
| 2005/0047895 A1 | 3/2005 | Lert, Jr. |
| 2005/0095095 A1 | 5/2005 | Hansl |
| 2005/0166787 A1 | 8/2005 | Astrom |
| 2005/0212478 A1 | 9/2005 | Takenaka |
| 2005/0217532 A1 | 10/2005 | Conneally |
| 2006/0018996 A1 | 1/2006 | Pollock et al. |
| 2006/0058921 A1 | 3/2006 | Okamoto |
| 2006/0104712 A1 | 5/2006 | Bufano et al. |
| 2006/0210382 A1 | 9/2006 | Mountz et al. |
| 2006/0216137 A1 | 9/2006 | Sakata et al. |
| 2006/0245862 A1 | 11/2006 | Hansl et al. |
| 2006/0257236 A1 | 11/2006 | Stingel et al. |
| 2007/0021864 A1 | 1/2007 | Mountz et al. |
| 2007/0059132 A1 | 3/2007 | Akamatsu et al. |
| 2007/0065258 A1 | 3/2007 | Benedict et al. |
| 2007/0071585 A1 | 3/2007 | Henkel |
| 2007/0177011 A1 | 8/2007 | Lewin et al. |
| 2007/0276535 A1 | 11/2007 | Haag |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0297879 A1 | 12/2007 | Yuyama et al. |
| 2008/0001372 A1 | 1/2008 | Hoffman et al. |
| 2008/0065265 A1 | 3/2008 | Ozick et al. |
| 2008/0154429 A1 | 6/2008 | Lee et al. |
| 2008/0161987 A1 | 7/2008 | Breed |
| 2008/0166217 A1 | 7/2008 | Fontana |
| 2008/0215180 A1 | 9/2008 | Kota |
| 2008/0269960 A1 | 10/2008 | Kostmann |
| 2008/0275609 A1 | 11/2008 | Boydell |
| 2008/0281717 A1 | 11/2008 | Kortelainen |
| 2009/0074545 A1 | 3/2009 | Lert, Jr. et al. |
| 2009/0099879 A1 | 4/2009 | Ouimet |
| 2009/0114115 A1 | 5/2009 | Minges |
| 2009/0185884 A1 | 7/2009 | Wurman et al. |
| 2009/0188774 A1 | 7/2009 | Tsujimoto |
| 2009/0216366 A1 | 8/2009 | Zuber et al. |
| 2009/0265031 A1 | 10/2009 | Tachibana et al. |
| 2010/0044124 A1 | 2/2010 | Radke et al. |
| 2010/0044977 A1 | 2/2010 | Hughes et al. |
| 2010/0076591 A1 | 3/2010 | Lert, Jr. |
| 2010/0086385 A1 | 4/2010 | Shani |
| 2010/0102532 A1 | 4/2010 | Timoney et al. |
| 2010/0131182 A1 | 5/2010 | Deegan et al. |
| 2010/0135759 A1 | 6/2010 | Dillon |
| 2010/0141483 A1 | 6/2010 | Thacher et al. |
| 2010/0145507 A1 | 6/2010 | Blust et al. |
| 2010/0234995 A1 | 9/2010 | Zini et al. |
| 2010/0272546 A1 | 10/2010 | Wolkerstorfer |
| 2010/0286905 A1 | 11/2010 | Goncalves et al. |
| 2010/0290874 A1 | 11/2010 | Wolkerstorfer |
| 2010/0316469 A1* | 12/2010 | Lert et al. .................. 414/273 |
| 2010/0324815 A1 | 12/2010 | Hiruta et al. |
| 2011/0008138 A1 | 1/2011 | Yamashita |
| 2011/0068943 A1 | 3/2011 | Lane, Jr. |
| 2011/0090064 A1 | 4/2011 | Dahms et al. |
| 2011/0106339 A1 | 5/2011 | Phillips et al. |
| 2011/0130974 A1 | 6/2011 | Yngve et al. |
| 2011/0176895 A1 | 7/2011 | Kortelainen |
| 2011/0185975 A1 | 8/2011 | van den Berg et al. |
| 2011/0202175 A1 | 8/2011 | Romanov et al. |
| 2011/0231016 A1 | 9/2011 | Goulding |
| 2011/0271469 A1 | 11/2011 | Ziegler et al. |
| 2012/0189409 A1* | 7/2012 | Toebes et al. ................ 414/273 |
| 2012/0189416 A1 | 7/2012 | Toebes et al. |
| 2012/0247239 A1 | 10/2012 | Hortig et al. |
| 2012/0277940 A1 | 11/2012 | Kumar et al. |
| 2012/0299260 A1 | 11/2012 | Goertzen et al. |
| 2013/0094926 A1 | 4/2013 | Olszak et al. |
| 2013/0142599 A1 | 6/2013 | McDowell et al. |
| 2015/0081089 A1 | 3/2015 | Kapust et al. |

FOREIGN PATENT DOCUMENTS

| | | |
|---|---|---|
| DE | 102011012950 | 9/2012 |
| EP | 0466004 | 7/1991 |
| EP | 499276 | 8/1992 |
| EP | 0499276 | 8/1992 |
| EP | 0737630 | 10/1996 |
| EP | 1193195 | 4/2002 |
| EP | 1775240 | 9/2006 |
| EP | 2039580 | 1/2008 |
| FR | 2730715 | 2/1995 |
| JP | 419131671 | 8/1973 |
| JP | 4735387 | 9/1973 |
| JP | 60153309 | 8/1985 |
| JP | 62041705 | 2/1987 |
| JP | 7157013 | 6/1995 |
| JP | 7187330 | 7/1995 |
| JP | 08113321 | 5/1996 |
| JP | 8133426 | 5/1996 |
| JP | 2000118615 | 4/2000 |
| JP | 2000122720 | 4/2000 |
| JP | 2001344020 | 12/2001 |
| JP | 2002356207 | 12/2002 |
| JP | 2004043109 | 2/2004 |
| JP | 2005138956 | 6/2005 |
| JP | 2008510673 | 4/2008 |
| JP | 2008100825 | 5/2008 |
| JP | 2009513457 | 4/2009 |
| JP | 2010158942 | 7/2010 |
| WO | 8501493 | 4/1985 |
| WO | 9534491 | 12/1995 |
| WO | 0187648 | 11/2001 |
| WO | 2005009324 | 2/2005 |
| WO | 2006024035 | 3/2006 |
| WO | 2008152245 | 12/2008 |
| WO | 2009/106988 | 9/2009 |
| WO | 2009106988 | 9/2009 |
| WO | 2010080539 | 7/2010 |
| WO | 2010118412 | 10/2010 |

* cited by examiner

AUTONOMOUS TRANSPORT VEHICLE

CROSS-REFERENCE TO RELATED APPLICATIONS

This application is a non-provisional of and claims the benefit of U.S. provisional patent application Ser. No. 61/423,409 filed on Dec. 15, 2010, the disclosure of which is incorporated herein by reference in its entirety.

BACKGROUND

1. Field

The embodiments generally relate to storage and retrieval systems and, more particularly, to autonomous transports of the storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the items transported to/from and stored on the storage racks are contained in carriers, for example storage containers such as trays, totes or shipping cases, or on pallets.

It would be advantageous for the automated transport vehicle to transition between a physically unrestrained guide system and a physically constrained guide system for transporting case units within the storage and retrieval system.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
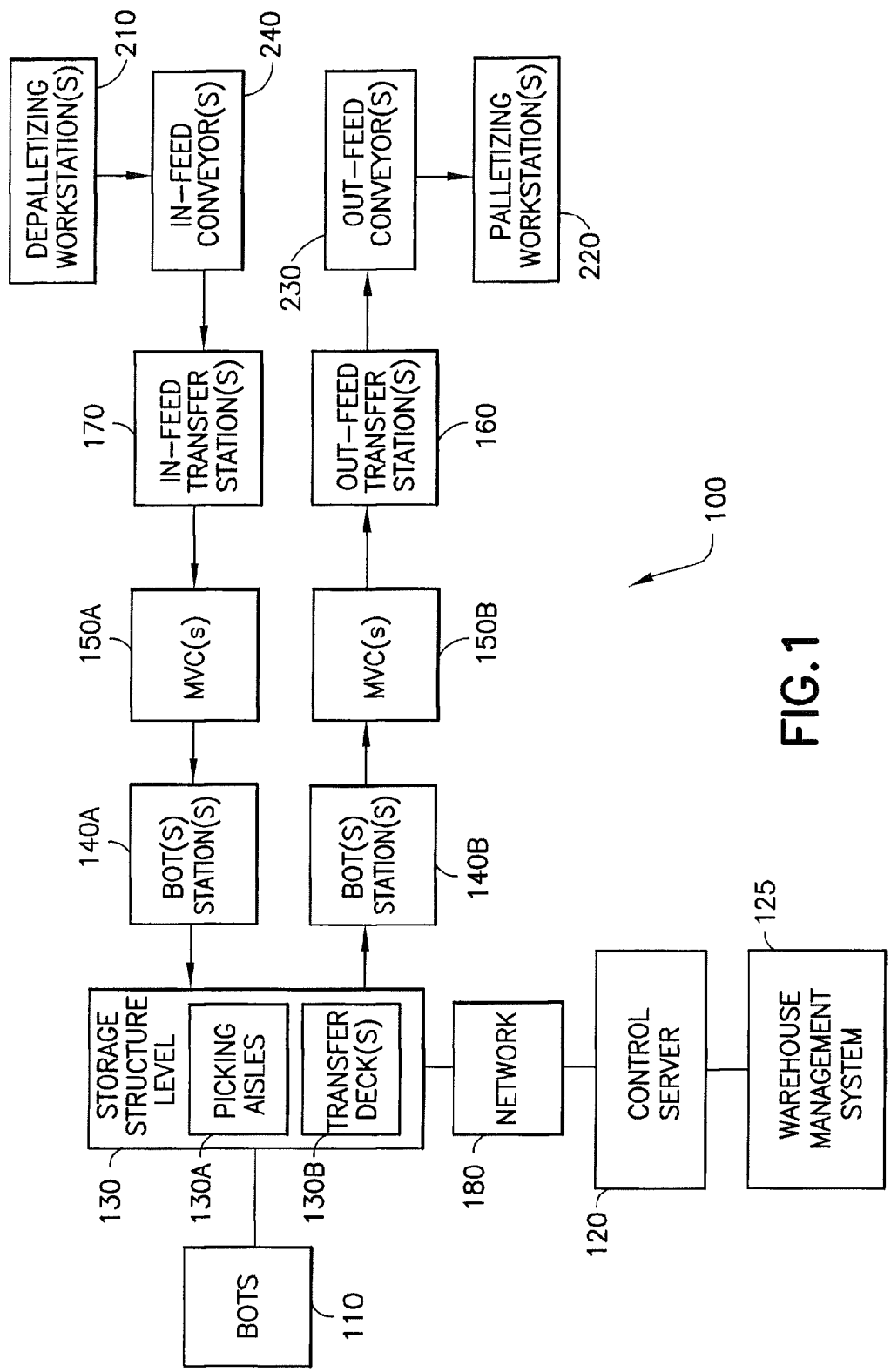
FIG. 1 schematically illustrates an exemplary storage and retrieval system in accordance with the embodiments.

FIG. 1 schematically illustrates an exemplary storage and retrieval system 100 in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may operate in a retail distribution center or warehouse to, for example, fulfill orders received from retail stores for case units (where case units as used herein means items not stored in trays, on totes or on pallets, e.g. uncontained or items stored in trays, totes or on pallets). It is noted that the case units may include cases of items (e.g. case of soup cans, boxes of cereal, etc.) or individual items that are adapted to be taken off of or placed on a pallet. In accordance with the embodiments, shipping cases or case units (e.g. cartons, barrels, boxes, crates, jugs, totes, pallets or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). It should be understood that the storage and retrieval system described herein may be applied to any environment in which case units are stored and retrieved.

The storage and retrieval system 100 may be configured for installation in, for example, existing warehouse structures or adapted to new warehouse structures. In the embodiments, the storage and retrieval system may include in-feed and out-feed transfer stations 170, 160, multilevel vertical conveyors 150A, 150B, autonomous transport vehicle or robot (referred to herein as "bots") stations 140A, 140B, a storage structure 130, and a number of bots 110. Suitable examples of storage and retrieval systems may be found in U.S. patent application Ser. No. 14/816,804 filed on Aug. 3, 2015, U.S. patent application Ser. No. 12/757,220, filed on Apr. 9, 2010 (now U.S. Pat. No. 9,096,375), U.S. patent application Ser. No. 14/293,556 filed on Jun. 2, 2014, U.S. patent application Ser. No. 12/757,381, filed on Apr. 9, 2010 (now U.S. Pat. No. 8,740,538), U.S. patent application Ser. No. 13/326,674, filed on Dec. 15, 2011, and U.S. Provisional Patent Application No. 61/423,340 filed on Dec. 15, 2010, the disclosures of which are incorporated by reference herein in their entireties. The in-feed transfer stations 170 and out-feed transfer stations 160 may operate together with their respective multilevel vertical conveyors 150A, 150B for bi-directionally transferring case units to and from one or more vertically stacked levels of the storage structure 130. It is noted that while the multilevel vertical conveyors 150 are described herein as being dedicated inbound or in-feed conveyors 150A and outbound or out-feed conveyors 150B, each of the conveyors 150A, 150B may be used for both inbound and outbound transfer of case units/items from the storage and retrieval system. The multilevel vertical conveyors 150 may be any suitable lifting devices for transporting case units between levels of the storage and retrieval system. It is noted that while multilevel vertical conveyors are described herein in other aspects the conveyors may be any suitable conveyors or transfer/picking devices having any suitable transport path orientation. Some non-limiting suitable examples of multilevel vertical conveyors can be found in, for example, U.S. patent application Ser. No. 14/679,535, filed on Apr. 6, 2015 (now U.S. Pat. No. 9,371,183), U.S. patent application Ser. No. 13/327,088, filed on Dec. 15, 2011 (now U.S. Pat. No. 8,998,554), U.S. Provisional Patent Application No. 61/423,298, filed on Dec. 15, 2010, and U.S. patent application Ser. No. 12/757,354, filed on Apr. 9, 2010 (the disclosures of which are incorporated by reference herein in their entireties) and U.S. patent application Ser. No. 12/757,220 filed on Apr. 9, 2010 (now U.S. Pat. No. 9,096,375)(previously incorporated by reference). For example, the multilevel vertical conveyors 150A, 150B may have any suitable number of support shelves for transporting the case units to a predetermined level of the storage and retrieval system 100. The multilevel vertical conveyor support shelves may have slatted supports configured to allow, for example, fingers 110F of a transfer arm 110A (FIG. 3) of the bots 110 to pass between the slats for transferring case units 101 (FIG. 2) to and from the conveyor 150. Case units may also be indirectly transferred between the bots 110 and the multilevel vertical conveyors 150A, 150B as described in, for example, U.S. Pat. No. 9,096,375 (previously incorporated by reference). It is noted that the transfer of case units between the bots 110 and multilevel vertical conveyors may occur in any suitable manner.

As may be realized, the storage and retrieval system 100 may include multiple in-feed and out-feed multilevel vertical conveyors 150A, 150B that are accessible by, for example, bots 110 on each of the stacked levels of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces on storage racks 600 (FIG. 2) and the multilevel vertical conveyors with one pick (e.g. substantially directly between the storage spaces and the multilevel vertical conveyors). By way of further example, the designated bot 110 picks the case unit(s) from a shelf of a multilevel vertical conveyor, transports the case unit(s) to a predetermined storage area of the storage structure 130 and places the case unit(s) in the predetermined storage area (and vice versa).

The bots 110 may be configured to place case units, such as the above described retail merchandise, into picking stock in the one or more levels of the storage structure 130 and then selectively retrieve ordered items for shipping the ordered items to, for example, a store or other suitable location. As described above, in the embodiments, the bots 110 may interface in any suitable manner with the multilevel vertical conveyors 150A, 150B such as through, for example, extension of a transfer arm 110A (FIG. 3) of the bot (which may have fingers 110F for interfacing with slatted support shelves of the multi-level vertical conveyors) relative to a frame of the bot. The bot may also interface with the multilevel vertical conveyors indirectly in any other suitable manner. Suitable examples of bots are described in U.S. patent application Ser. No. 15/137,889 filed on Apr. 25, 2016, U.S. patent application Ser. No. 13/860,802 filed on Apr. 11, 2013, (now U.S. Pat. No. 9,321,591), U.S. patent application Ser. No. 12/757,312, filed on Apr. 9, 2010, (now U.S. Pat. No. 8,425,173), U.S. patent application Ser. No. 14/942,717, filed Nov. 16, 2015, U.S. patent application Ser. No. 13/327,040 filed on Dec. 15, 2011 (now U.S. Pat. No. 9,187,244), U.S. Provisional Patent Application No. 61/423,220 filed on Dec. 15, 2010, U.S. patent application Ser. No. 13/326,952 filed Dec. 15, 2011 (now U.S. Pat. No. 9,499,338), U.S. Provisional Patent Application No. 61/423,365 filed on Dec. 15, 2010, U.S. patent application Ser. No. 13/326,993, filed Dec. 15, 2011, U.S. Provisional Patent Application No. 61/423,388 filed on Dec. 15, 2010, U.S. patent application Ser. No. 15/243,490 filed on Aug. 22, 2016, U.S. patent application Ser. No. 14/629,003 filed on Feb. 23, 2015 (now U.S. Pat. No. 9,423,796), U.S. patent application Ser. No. 13/326,447, filed on Dec. 15, 2011, (now U.S. Pat. No. 8,965,619), United States Provisional Patent Application No. 61/423,359 filed on Dec. 15, 2010, U.S. patent application Ser. No. 15/094,214 filed on Apr. 8, 2016, U.S. patent application Ser. No. 14/684,715, filed on Apr. 13, 2015, (now U.S. Pat. No. 9,309,050), U.S. application Ser. No. 13/327,035 filed Dec. 15, 2011 (now U.S. Pat. No. 9,008,884), United States Provisional Patent Application No. 61/423,206 filed on Dec. 15, 2010, the disclosures of which are incorporated by reference herein in their entireties.

The storage structure 130 may include multiple levels of storage rack modules 600 (FIG. 2) where each level includes an array of storage spaces (arrayed on the multiple levels and in multiple rows on each level), picking aisles 130A formed between the rows of storage spaces, and transfer decks 130B. In the embodiments, the picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 of the exemplary embodiments may also be arranged such that there is no vertical or horizontal array partitioning of the storage structure. For example, each multilevel vertical conveyor 150A, 150B may be common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning). It is noted that the storage and retrieval system may also be configured so that each multilevel vertical conveyor serves a predetermined area of the array of storage spaces. Suitable exemplary configurations of storage and retrieval systems can be found in, for example, U.S. patent Ser. No. 14/293,556 filed on Jun. 2, 2014, and U.S. patent application Ser. No. 12/757,381, filed on Apr. 9, 2010 (now U.S. Pat. No. 8,740,538), the disclosures of which are incorporated by reference herein in their entireties.

The storage structure 130 may also include charging stations 290 for replenishing, for example, an electricity storage device of the bots 110 as described in, U.S. patent application Ser. No. 14/799,367 filed on Jul. 14, 2015, U.S. patent application Ser. No. 13/326,823 filed on Dec. 15, 2011, (now U.S. Pat. No. 9,082,112), U.S. Provisional Patent Application No. 61/423,402 filed on Dec. 15, 2010, the disclosures of which are incorporated by reference herein in their entireties.

The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in the embodiments, the system control server 120 may be configured to manage and coordinate the overall operation of the storage and retrieval system 100 and interface with, for example, a warehouse management system 125, which in turn manages the warehouse facility as a whole. The control server 120 may be substantially similar to that described in, for example, U.S. patent Ser. No. 14/733,341 filed Jun. 8, 2015, U.S. patent application Ser. No. 14/089,434 filed on Nov. 25, 2013 (now U.S. Pat. No. 9,051,120), U.S. patent application Ser. No. 12/757,337 filed on Apr. 9, 2010 (now U.S. Pat. No. 8,594, 835), the disclosures of which are incorporated by reference herein in their entireties.

Figure 2:
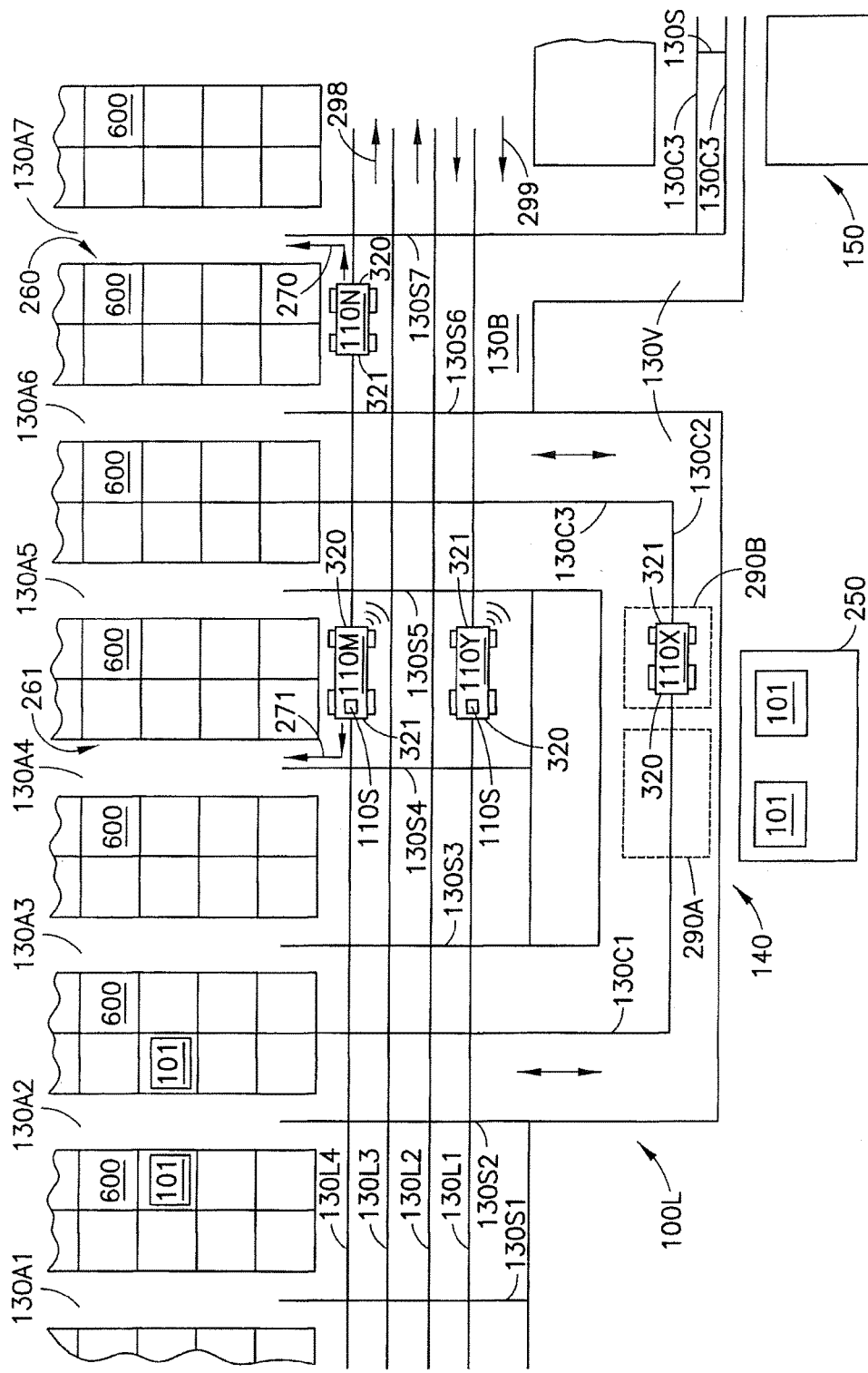
FIG. 2 is a schematic illustration of a portion of the storage and retrieval system of FIG. 1 in accordance with the embodiments.

Referring now to FIG. 2, a portion of one level 100L of the storage and retrieval system 100 is shown. As may be realized substantially similar levels may be located above and/or below level 100L to form an array of vertically stacked storage levels as described above. In the embodiments each level 100L may have a transfer deck 130B and one or more picking aisles 130A1-130A7. Storage racks 600 may be disposed on either side of each picking aisle 130A1-130A7 so that case units 101 may be stored on both sides of each picking aisle.

The transfer deck 130B may be configured to allow generally physically unrestrained travel of the bots 110 while on the transfer deck 130B. For example, the transfer deck 130B may have any suitable number of travel guide lines 130L1-130L4 and any suitable number of shunt or bypass guide lines 130S1-130S7 that form one or more travel paths or lanes for the bots 110 to traverse. For example, guide lines 130L1, 130L2 allow travel in a first direction and guide lines 130L3, 130L4 allow travel in a second direction substantially opposite the first direction. It is noted that while the direction of travel along a respective guide line 130L1-130L4 is generally in a single direction, the guide lines, in combination with for example suitable bot traffic management, may allow for limited bidirectional travel of the bots 110 along the guide lines 130L1-130L4 as described below. In the embodiments bot traffic may be managed through, for example, bot-to-bot communications and/or traffic may be managed by bot location tracking and management through, for example, control server 120 or other suitable controller of the storage and retrieval system. A suitable example, of bot traffic management may be found in, for example, U.S. application Ser. No. 14/733,341 filed on Jun. 8, 2015, U.S. patent application Ser. No. 14/089,434 filed on Nov. 25, 2013 (now U.S. Pat. No. 9,051,120), U.S. patent application Ser. No. 12/757,337 filed on Apr. 9, 2010 (now U.S. Pat. No. 8,594,835), the disclosures of which are incorporated by reference herein in their entireties.

Shunt guide lines 130A1-130S7 may also be arranged on the transfer deck transverse to the guide lines 130L1-130L4 for allowing the bots 110 to bi-directionally switch between guide lines 130L1-130L4 and enter the picking aisles 130A1-130A7. The shunt guide lines 130S1-130S7 are oriented substantially transverse to the travel guide lines 130L1-130L4. The shunt guide lines 130S1-130S7 may allow bots access to, for example, the picking aisles 130A or the bot stations 140 without traversing an entire length of the travel guide lines 130L1-130L4. In the embodiments, the shunt guide lines may be aligned with the picking aisles 130A1-130A7 or any other suitable ingress or egress location of the storage and retrieval system allowing the bot to turn down a corresponding picking aisle while travelling along any one of the travel guide lines 130L1-130L4. It is noted that the shunt guide lines 130S1-130S7 may also be located at ends of the transfer deck 130B or at any other suitable locations of the transfer deck 130B. The shunt guide lines 130A1-130S7 may also be used to track a position of the bot 110 through the storage and retrieval system structure and monitor travel along the travel guide lines 130L1-130L4. For example, the position of the shunt guide lines 130A1-130S7 may be recorded in a memory accessible by or within control server 120 and the bots 110 may be configured to detect and send signals corresponding to the shunt guidelines 130A1-130S7 to the control server 120 so that a position of the bot and whether one or more bots are moving along e.g. the travel guide lines 130L1-130L4 can be determined by the control server.

Bot station guide lines 130C1-130C3 may also be provided on the transfer deck 130B for allowing the bots 110 to enter the bot stations 140 for interfacing with a respective multilevel vertical conveyor 150 from any one of the guide lines 130L1-130L4. The conveyor access guide lines 130C1-130C3 may be substantially similar to the shunt guide lines 130S1-130S2. In this example the entrance/exit guide lines 130C1, 130C2 of the bot station 140 are shown as not being aligned with any of the shunts 130S1-130S7 but in other embodiments the entrance/exit guide lines for the bot stations 150 may be substantially aligned with the shunts (see e.g. guide line 130S7) so that, where a course of travel permits, bots 110 can travel directly from a picking aisle to a bot station and vice versa. It is noted that while the embodiments of the transfer deck 130B and bot stations 140 are described herein with respect to line following, the transfer deck 130B and bot stations 140 may be configured so that the bots are guided by any suitable rail system.

Figure 3:
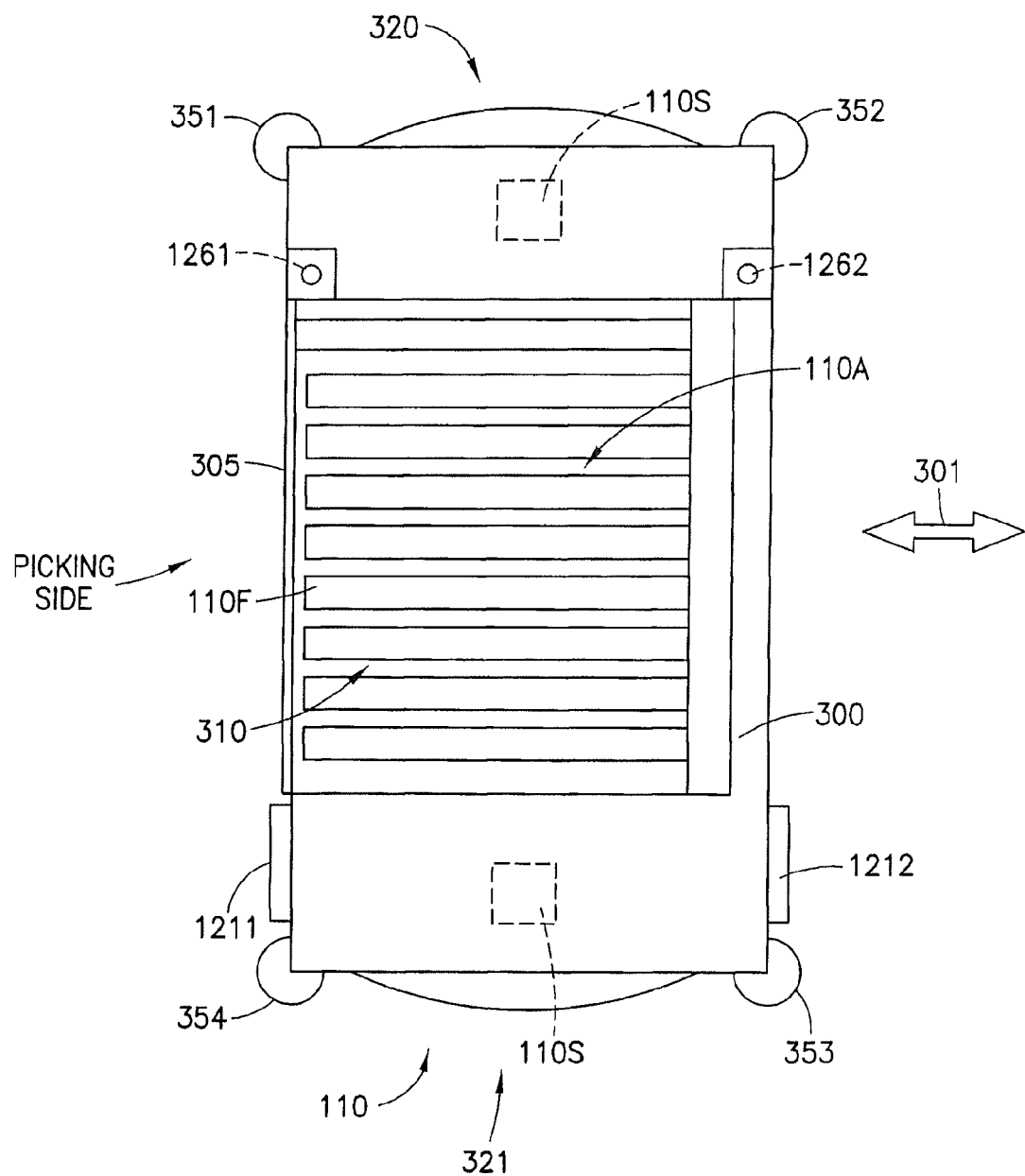
FIG. 3 illustrates a schematic illustration of an autonomous transport vehicle in accordance with the embodiments.

Referring also to FIG. 3 Each bot 110 may employ a combination of guide and positioning systems, for example, line following (e.g. on the transfer deck 130B) and rail guidance (e.g. within the picking aisles). The storage and retrieval system may be configured to allow the bot to transition between the structurally deterministic or restrained guide system within, for example, the picking aisles and the unrestrained guidance system of, for example, the transfer decks. The transitions between the guidance systems may also include a change in bot orientation (e.g. front end leading the direction of travel or the front end trailing the direction of travel). Each bot 110 may include any suitable guides mounted to a frame 300 of the bot 110 where the guides are configured to engage the restrained guidance system in a predetermined and repeatable manner to allow for an accurate and predetermined reach of a transfer arm 110A of the bot 110 for transferring case units 101 between the bot 110 and, for example, a storage shelf 600. The guides may also, at least in part, facilitate the transition between the unrestrained and restrained guidance systems.

Each bot 110 may include a frame 300, independently driven drive wheels 1211, 1212 and, for example lockable caster wheels 1261, 1262. It is noted that the bot may have any suitable drive for driving the driven wheels and/or any suitable steering mechanism for turning steering wheels of the bot 110. It is noted that the general direction of travel of the bots 110 may be with the front end 320 leading the direction of travel with the caster wheels 1261, 1262 locked as described in U.S. patent application Ser. No. 15/243,490 filed on Aug. 22, 2016, U.S. patent application Ser. No. 14/629,003 filed on Feb. 23, 2015 (now U.S. Pat. No. 9,423,796), U.S. patent application Ser. No. 13/326,447, filed on Dec. 15, 2011 (now U.S. Pat. No. 8,965,619), and United States Provisional Application No. 61/423,359 filed on Dec. 15, 2010, previously incorporated by reference herein, so that the bot may stably travel at substantially high speeds. At lower speeds the bot may travel with the front end leading or the front end trailing. The bot can also be configured to be driven with unlocked casters by any suitable control system on-board the bot or located remotely from the bot.

The frame 300 may have a front end 320 and a back end 321 longitudinally separated from the front end 320. The frame 300 may form a payload holding area 310 having an extendable arm 110A configured to extend and retract in the direction of arrow 301. The arm 110A may have cantilevered fingers 110F for supporting case units when transferring the case units to and from the bot 110. The fingers 110F may be arranged to fit between slatted supports on the storage shelves 600 and multilevel vertical conveyor 150 shelves for transferring case units to and from the storage shelves 600 and multilevel vertical conveyors 150. It is noted that the bot arm 110A may have any suitable configuration for transferring case units to and from the bot 110. In the embodiments the arm 110A of the bot 110 is configured for extension on one lateral side of the bot 110 (e.g. the picking side of the bot on which a pick fence 305 is located where the case units may be lifted over the pick fence during transfer to and from the bot and the pick fence may be used to hold case units on the bot 110 during transport). It is noted that the arm 110A may be configured for extension on both lateral sides of the bot. Where the arm 110A extends to one side of the bot 110, the bot orientation (e.g. front end leading or front end trailing) with respect to the direction of travel of the bot 110 is accounted for so that the extension direction of the arm 110A is located on the side of the picking aisle 130A1-130A7 or bot station at which the case units are to be picked from or transferred to.

The bot 110 may also have any suitable number of sensors 110S for sensing the guide lines 130L1-130L4, 130S1-130S7, 130C1-130C3 as described in, for example, United States Provisional patent application Ser. No. 14/799,367 filed on Jul. 14, 2015 (now U.S. Pat. No. 9,499,062), U.S. patent application Ser. No. 13/326,823 filed on Dec. 15, 2011 (now U.S. Pat. No. 9,082,112), U.S. Provisional Patent Application No. 61/423,402 filed on Dec. 15, 2010, U.S. patent application Ser. No. 15/137,889 filed on Apr. 25, 2016, U.S. patent application Ser. No. 13/860,802 filed Apr. 11, 2013 (now U.S. Pat. No. 9,321,591), and U.S. patent application Ser. No. 12/757,312 filed Apr. 9, 2010, (now U.S. Pat. No. 8,425,173), previously incorporated by reference herein. It is noted that the bot can at times drive without the use of guide lines through any means of control such as, for exemplary purposes only, dead reckoning, state estimation, and use of gyroscopes and accelerometers.

Figure 4A:
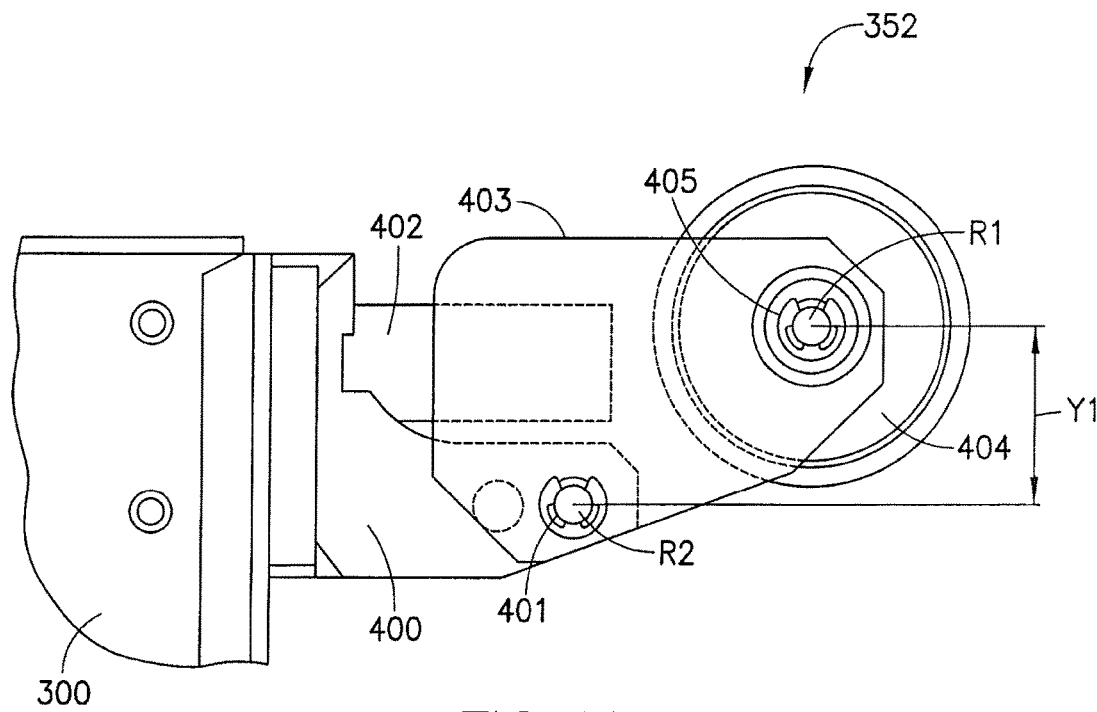
FIGS. 4A and 4B are exemplary illustrations of portions of the autonomous transport vehicle of FIG. 3 in accordance with the embodiments.
Figure 4B:
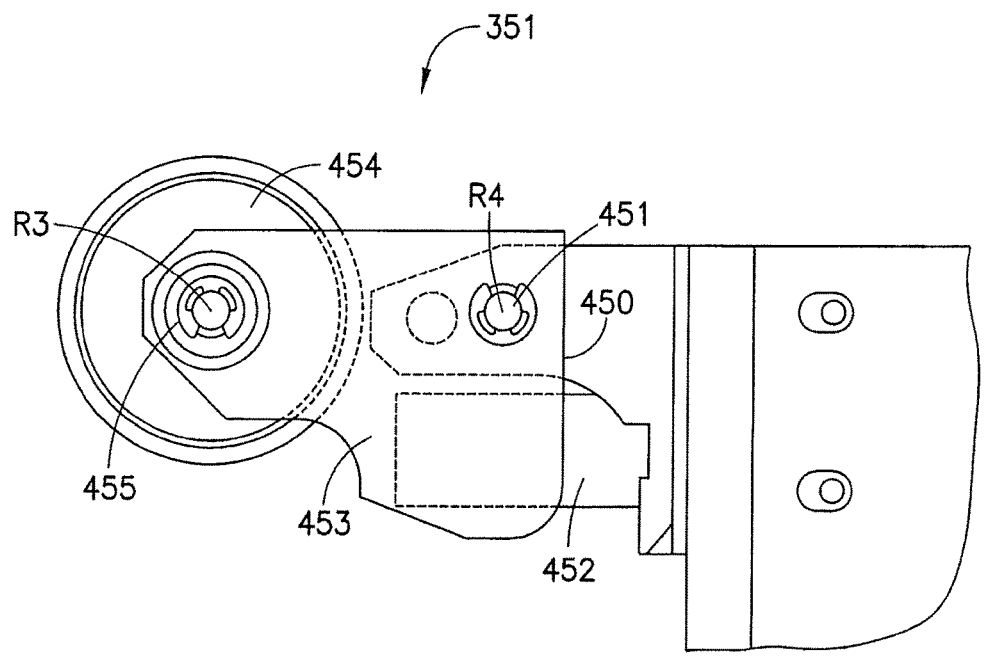

The bots 110 may have any number of suitable guide wheels 351-354 for guiding the bot 110 into and along the picking aisles 130A1-130A7. Suitable guide wheel/rail interaction is described in, for example, U.S. Pat. Nos. 8,425,173, 8,740,538 and 9,096,375, previously incorporated by reference. It is noted that the guide wheels 351-354 may interface with any suitable guides in any suitable manner. While guide wheels are shown in the Figs. in other aspects it should be understood that the bot may include any suitable guide members having, for example, a two-dimensional pivot offset and a one-dimensional pivot offset. It is further noted that one or more of the guide members may have a different spring rate than other ones of the guide members. Referring also to FIGS. 4A and 4B the bot may include pairs of guides, such as for example, guide wheels 351-354 located at the outer corners of the bot frame 300. While the guides are described herein as being guide wheels in alternate embodiments any suitable type of guides may be used. One pair of guides may be located at each end of the bot 110. For example, guide wheels 351, 352 may be located at a front 320 of the bot while guide wheels 353, 354 are located at a back of the bot 110. Each guide wheel pair may include a substantially compliant guide wheel 352, 353 and a substantially fixed guide wheel 351, 354 located on opposite sides of the bot 110. For exemplary purposes only in the embodiments the substantially fixed guide wheels may be located on a side of the bot from which the transfer arm extends 110A. In the embodiments the substantially fixed guide wheels may alternatively be located on the side of the bot opposite the side from which the bot arm extends. It is noted that in the embodiments, the substantially fixed and substantially compliant guide wheels may have any suitable locational arrangement on the bot.

As shown in FIG. 4A the substantially compliant guide wheels 352, 353 may be pivotally mounted to the bot 110 on a mounting member 400 and may include a pivot member 401, a bumper 402, a guide wheel fork 403, wheel 404 and wheel retainer 405. In the embodiments, the guide wheel fork 403 is pivotally mounted at a first end to the mounting member 400 by pivot member 401. The pivot member may be any suitable axle or pivot. The wheel 404 is rotatably mounted to a second end of the guide wheel fork 403 by wheel retainer 405. The wheel retainer 405 may be any suitable axle or other retaining mechanism. The bumper 402 may be any suitable shock absorber that is mounted between the bot frame 300 and the wheel 404 for substantially limiting the travel of the wheel 404 while allowing the wheel to rotate about wheel retainer 405. It is noted that in the embodiments the substantially compliant guide wheels may have any suitable configuration.

As shown in FIG. 4B the substantially fixed guide wheels 351, 354 may also be pivotally mounted to the bot 110 on a mounting member 450 and may include a pivot member 451, a bumper 452, a guide wheel fork 453, wheel 454 and wheel retainer 455. In the embodiments, the guide wheel fork 453 is pivotally mounted at a first end to the mounting member 450 by pivot member 451. The pivot member may be any suitable axle or pivot. The wheel 454 is rotatably mounted to a second end of the guide wheel fork 453 by wheel retainer 455. The wheel retainer 455 may be any suitable axle or other retaining mechanism. The bumper 452 may be any suitable shock absorber or other suitable resilient member that is mounted between the bot frame 300 and the wheel 454 for substantially limiting the travel of the wheel 454 and absorbing forces applied to the bot 110 while allowing the wheel to rotate about wheel retainer 455. It is noted that in the embodiments the substantially fixed guide wheels may have any suitable configuration.

Referring to both FIGS. 4A and 4B it is noted that the axis of rotation R1, R3 of the wheels 404, 454 relative to the axis of rotation R2, R4 of the guide wheel forks 403, 453 for the substantially compliant guide wheels 352, 353 and the substantially fixed guide wheels 351, 354 may be different. For example, the axis of rotation R1 of the substantially compliant guide wheels 352, 353 may be longitudinally offset by a distance Y1 from the axis of rotation R2 of the guide wheel fork 403 while the axes of rotation R3, R4 for the substantially compliant guide wheels 351, 354 are located substantially longitudinally aligned with each other. These guide wheel configurations may allow both guide wheels to rotate about respective axes R2, R4 while entering, for example, a picking aisle 130A1-130A7. However, when travelling within the picking aisle 130A1-130A7 these configurations may maintain substantially fixed guide wheels 351, 354 substantially fixed about axis R4 and allow the substantially compliant guide wheels 352, 353 to rotate about axis R2. As may be realized, the guide wheels are asymmetrically compliant guide members so that a stiffness of the at least one first guide member in response to a force in a predetermined direction relative to the first guide member frame of reference (e.g. in an X-Y plane) is different than a stiffness of the at least second guide member in response to the force in the predetermined direction relative to the second guide member frame of reference (e.g. in an X-Y plane) as will be described in greater detail below.

Figure 5:
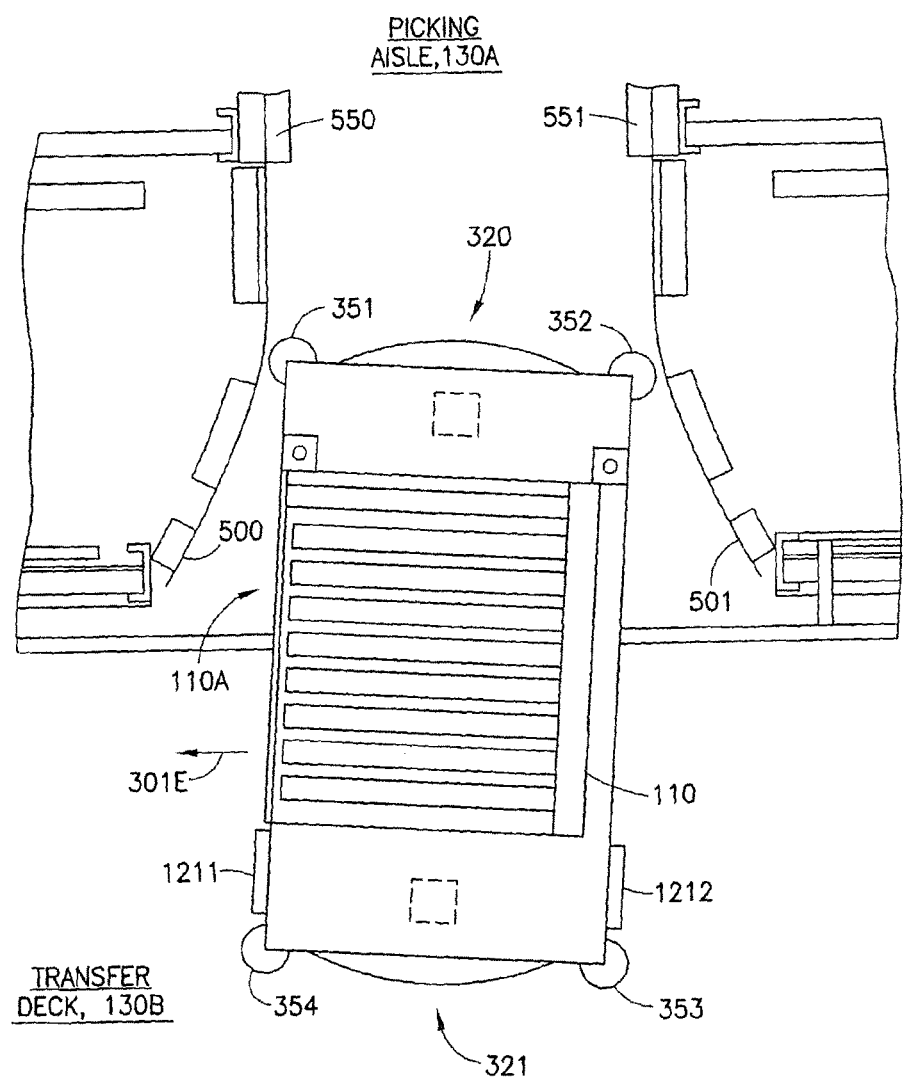
FIG. 5 is a schematic illustration of a portion of the storage and retrieval system of FIG. 1 in accordance with the embodiments.
Figure 6A:
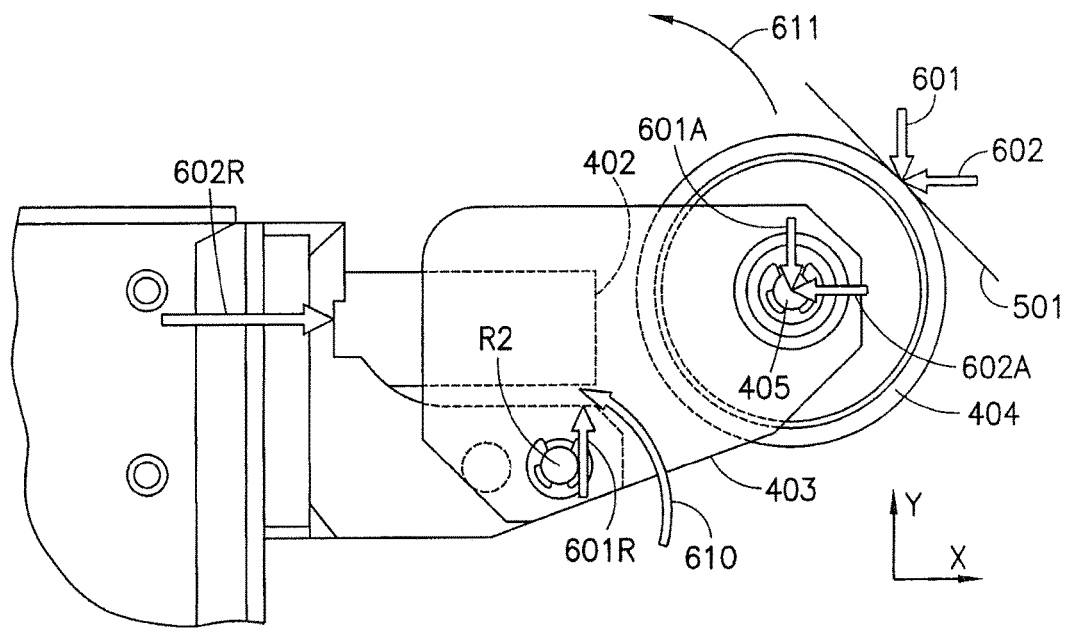
FIGS. 6A and 6B are exemplary schematic force diagrams of forces applied to the autonomous transport vehicle of FIG. 3 in accordance with the embodiments.
Figure 6B:
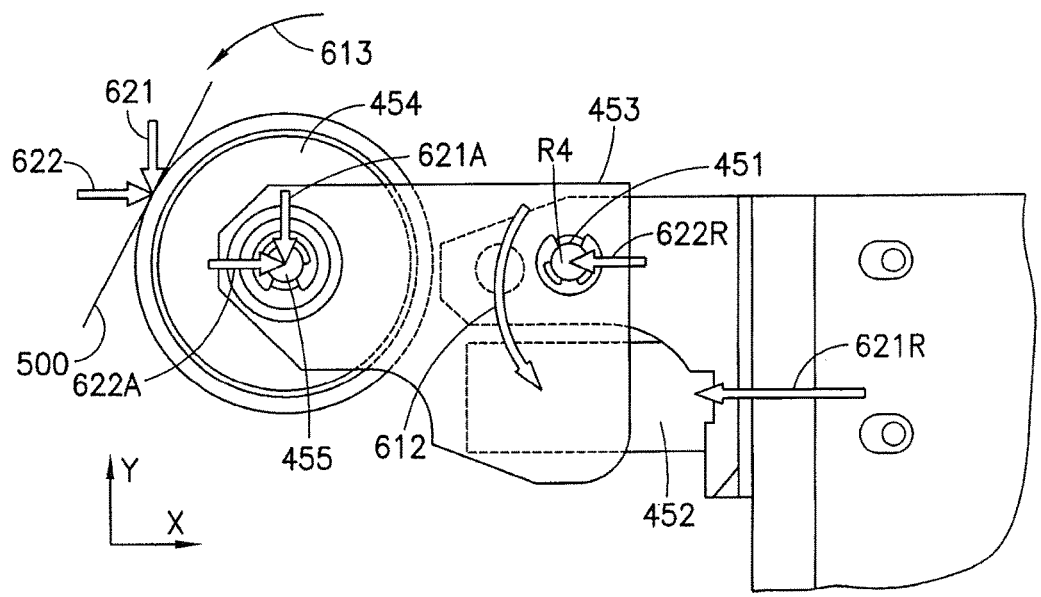

Referring also to FIGS. 2, 5, 6A and 6B each of the guide wheels 351-354 may be configured to interface with lead-in structures or guides of the storage and retrieval system 100. For example, in one exemplary embodiment a pair of angled guide members 500, 501 may be positioned at least partially on the transfer deck 130B in a transition area for transitioning between the transfer deck and, for example, a picking aisle. The angled guide members 500, 501 may be any suitable guide members having any suitable configuration for cooperating with one or more guide wheels 351-354 and at least in part directing a bot 110 into the picking aisle 130A. For example, bot 110N may be travelling along guide line 130L4 (which provides a general direction of travel in the direction of arrow 298) to pick/place a case unit 101 in picking aisle 130A7. In the embodiments the case unit may be located on the left side 260 of the aisle 130A7. As can be seen in FIG. 5 the bot transfer arm 110, in this example, is configured to extend to the left side of the bot 110 (with respect to a longitudinal or Y axis of the bot defined between the front and back ends 320, 321). As such, for the bot to pick/place a case unit 101 from the left side 260 of the picking aisle 130A7 the bot travels down the picking aisle with the front end 320 leading the direction of travel. As the bot turns down the picking aisle 130A7 a differential torque is applied to the independently driven drive wheels 1211, 1212 causing the front end 320 of the bot to swing in the direction of arrow 270. As the front end 320 of the bot 110 turns in the direction of arrow 270 substantially compliant guide wheel 352 may contact the angled guide member 501. The contact between the substantially compliant guide wheel 352 and guide member 501 may assist the bot 110 in aligning with the guide rails 550, 551 of the picking aisle. For example, as the bot 110 continues to turn, the guide members 500, 501 form a funnel-like arrangement such that contact between the substantially compliant guide member 352 effects contact between substantially fixed contact member 351 and guide member 500. As the bot moves further into the picking aisle guide wheels 353, 354 may also come into contact with their respective guide members 500, 501 for alignment with the guide rails 550, 551. As may be realized, during guided travel of the bot, guide wheels of the bot do not always have to be in contact with the guide rails. For example, tolerance variations, bends in the rails, variations in assembly of the storage structure may cause the guide wheels to temporarily break contact with a surface of the guide rails. It is noted that the guide rail system could include a system of opposing magnetic fields (e.g. the bot includes a magnetic field generator and the storage structure includes a magnetic field generator each having opposing polarities) that are configured to maintain a travel path of the bot without providing any substantial resistance to bot motion along the travel path.

When the substantially compliant guide wheel, such as guide wheel 352 contacts the guide member 501 forces 601, 602 are applied by the guide member 501 to the wheel 404 in both the X and Y directions, where the Y direction is parallel with the longitudinal axis (e.g. front to back) of the bot 110 and the X direction is transverse (e.g. substantially parallel with the lateral axis of the bot 110) to the Y direction. These forces 601, 602 are transferred to the wheel retainer 405 as translated forces 601A, 602A. These translated forces 601A, 602A cause resultant forces 601R, 602R to be exerted in both the X and Y directions by the substantially compliant guide wheel back towards the guide member 501. Because the axis of rotation of the guide wheel retainer 405 is longitudinally offset (e.g. in the Y-direction) from the axis of rotation R2 of the pivot member 401 by the distance Y1 (FIG. 4A) the forces exerted on the guide wheel cause a rotating moment 610 such that the wheel fork 403 (and wheel 404) rotates about the pivot member 401 in the direction of arrow 611. The bumper 402 may in part resist or absorb the translated forces applied to the guide wheel and provide at least in part some resistance to the rotating moment 610. It is noted that a similar moment may be generated on substantially compliant guide wheel 352 as the guide wheel 352 contacts the guide member 501 and the back 321 of the bot comes into alignment with the guide rails 550, 551.

As the substantially fixed guide wheel, such as guide wheel 351 contacts the guide member 500 forces 621, 622 are applied by the guide member 501 to the wheel 404. These forces 621, 622 are transferred to the wheel retainer 455 as translated forces 621A, 622A. These translated forces 621A, 622A cause resultant forces 621R, 622R to be exerted in the X direction by the substantially compliant guide wheel back towards the guide member 500. Because of the arrangement of the wheel retainer 455 and pivot member 451 being laterally aligned only the forces in the Y direction may contribute to creating a rotating moment 612 such that the wheel fork 453 (and wheel 454) rotates about the pivot member 451 in the direction of arrow 613. The bumper 452 may in part resist or absorb the translated forces applied to the guide wheel and at least in part resist the rotating moment 612. It is noted that a similar moment may be generated on substantially fixed guide wheel 354 as the guide wheel 354 contacts the guide member 500 and the back 321 of the bot comes into alignment with the guide rails 550, 551.

Figure 7:
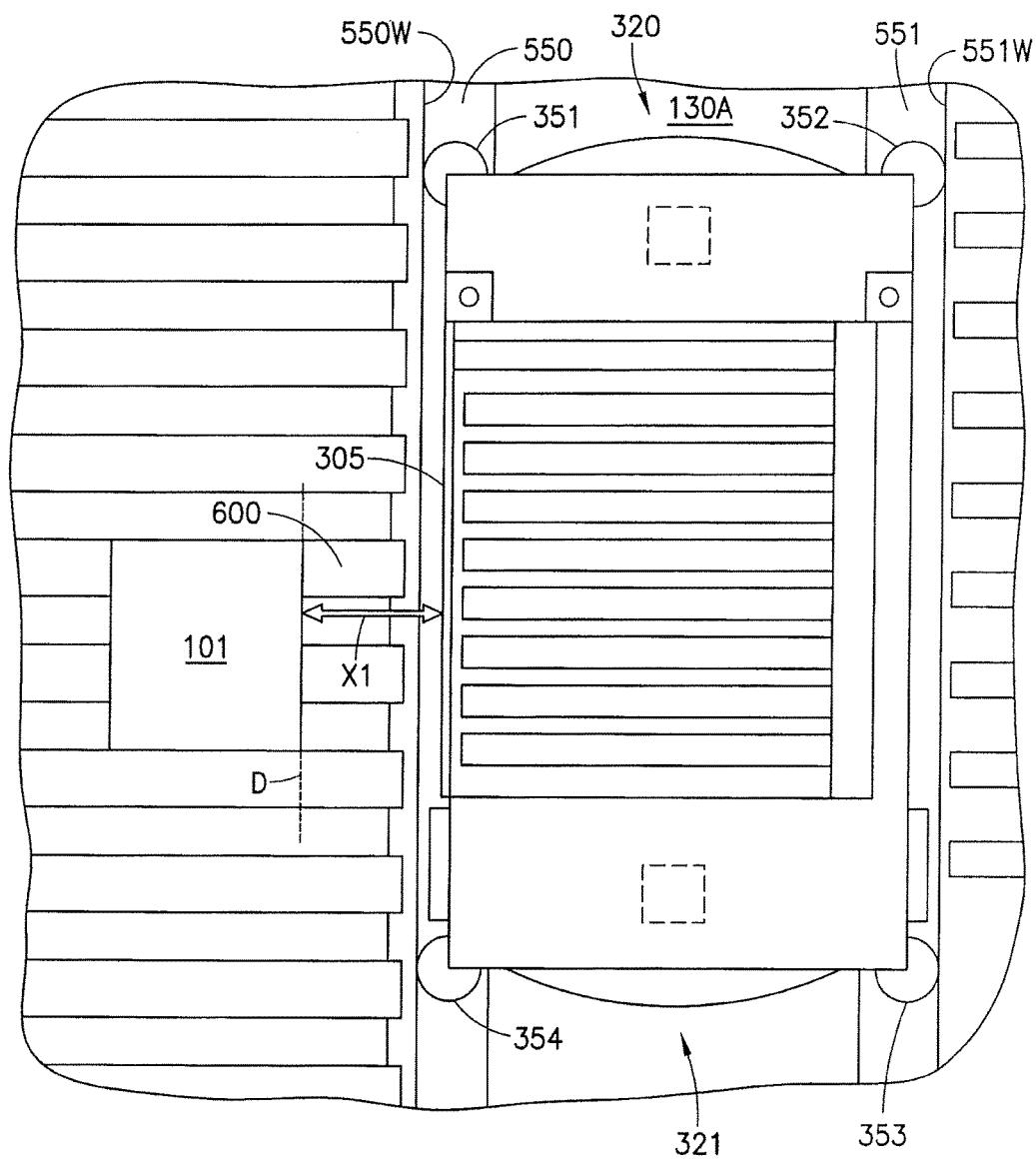
FIG. 7 is a schematic illustration of an autonomous transport vehicle within a picking aisle of the storage and retrieval system of FIG. 1 in accordance with the embodiments.
Figure 8A:
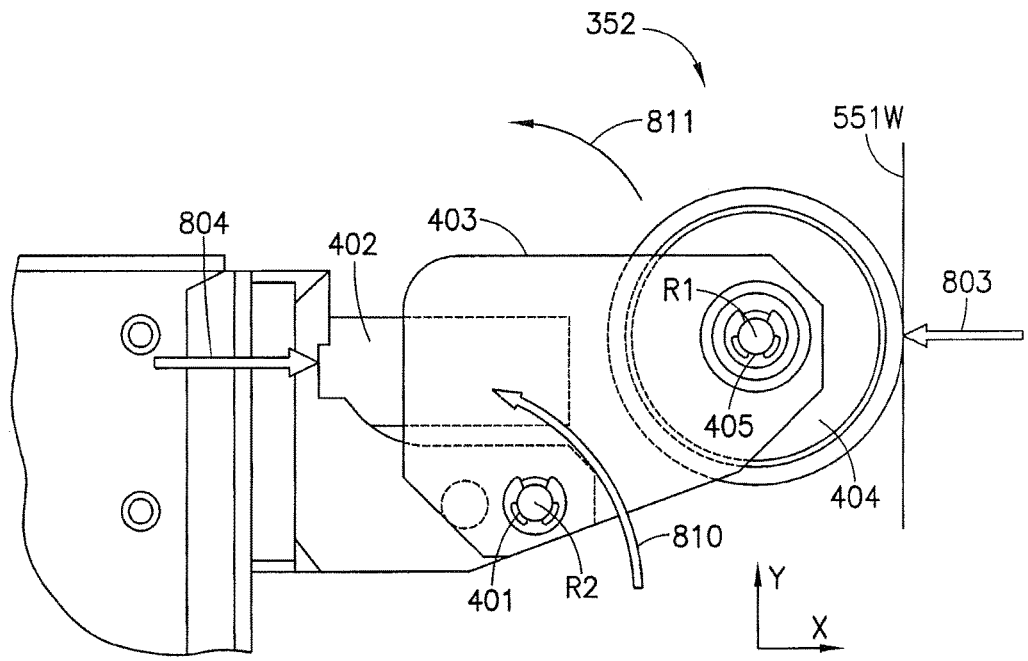
FIGS. 8A and 8B are exemplary schematic force diagrams of forces applied to the autonomous transport vehicle of FIG. 3 in accordance with the embodiments.
Figure 8B:
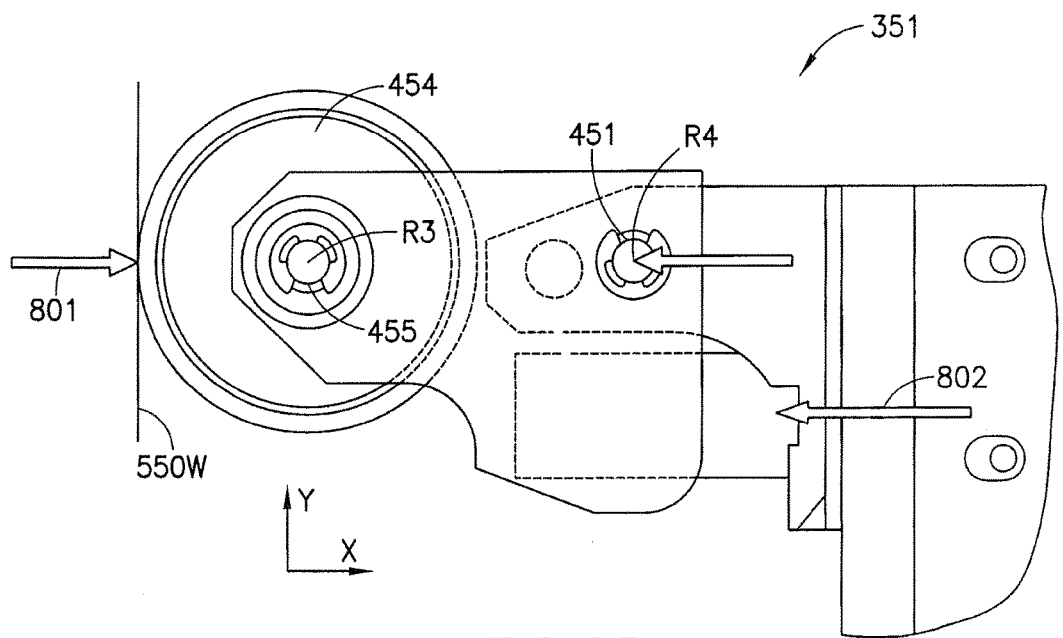

Referring to FIGS. 7, 8A and 8B, once in the picking aisle 130A the guide wheels 351-354 may ride along vertical portions 550W of the guide rails 550, 551 for positioning the bot 110 a predetermined distance X1 from the case units 101 stored on the storage shelves 600. In this example, the distance X1 is determined between the pick fence 305 of the bot 110 and a predetermined datum plane D along which the case units 101 may be aligned. When in the picking aisle 130A the vertical portion 550W of rail 550 may exert a force 801 in the X direction against the wheel 454 of substantially fixed guide wheel, such as guide wheel 351. A resultant force 802 may be applied by the substantially fixed guide wheel 351. Because of the axis of rotation R3 of the wheel retainer 455, the axis of rotation R4 of the pivot member 451 and the force 801, 802 being along the same lateral (e.g. X direction) line the substantially fixed guide wheel remains substantially rigid without any rotating moments being applied to the guide wheel 351. Similar forces may be generated on and by substantially fixed guide wheel 354. Because there are no rotating moments applied to the substantially fixed guide wheels 351, 354 while in the picking aisles the rigid arrangement of the guide wheels 351, 354 maintains, for example, the pick fence 305 of the bot 110 at the predetermined lateral distance X1 away from the datum plane D.

The forces exerted on the substantially compliant guide wheels, such as guide wheel 352, in the picking aisles 130A may be substantially similar to those described above with respect to the substantially fixed guide wheels 351, 354. For example, the vertical portion 551W of guide rail 551 may exert force 803 in the X direction against the wheel 405 which results in a resultant force 804 being generated by the guide wheel 352. Because the axis of rotation R1 of the wheel retainer 405 (e.g. substantially the point at which the force 803 is applied) is longitudinally offset from the axis of rotation R2 of the pivot member 401 a rotating moment 810 is generated causing the wheel 404 (and wheel fork 403) to pivot in the direction of arrow 811 about pivot member 401. The wheel 404 may continue to pivot about pivot member 401 until substantially stopped by the bumper 402. It is noted that similar forces may be generated against and to the substantially compliant guide wheel 353. The forces (e.g. the resultant force 804) applied in this example, by the bumpers 804 of their respective substantially complaint guide wheels 352, 353 in combination with the compliant rotation of the respective wheel forks 403 about respective pivot members 401 causes the bot 110 to be pushed laterally so that the substantially fixed guide wheels 351, 354 are held against the vertical portion 550W of the guide rail 550 for maintaining the distance X1.

Referring to FIG. 2, as an example of bot travel, a bot 110Y travelling along a path corresponding to guide line 130L1 may be instructed to transfer an item to a storage location in picking aisle 130A5. However, the bot 110Y may have already passed the shunt guide line 130S5 corresponding to picking aisle 130A5. The bot may continue to travel along guide line 130L1 until it encounters the next available shunt (e.g. a shunt not being used by another bot) such as shunt guide line 130S4. The bot may turn onto shunt guide line 130S4 and then turn onto one of the guide lines 130L3, 130L4 so that the bot 110 is travelling in substantially the opposite direction towards the picking aisle 130A5. The bot may continue to travel along one of the guide lines 130L3, 130L4 until it encounters shunt guide line 130S5, corresponding to picking aisle 130A5, where the bot turns onto shunt guide line 130S5 for transitioning into or otherwise entering the picking aisle 130A5 guide way (such as, for example, a rail guidance system).

As described above, the direction (e.g. front end leading or front end trailing) the bot enters the picking aisle may depend on which side of the picking aisle a case unit is to be picked from or placed to. In the examples above with respect to bots 110N, 110Y the bot entered the picking aisles with the front end 320 leading. The travel paths defined by guide lines 130L1-13L4 may provide at least limited bidirectional bot travel for allowing the bot to enter the picking aisle with the front end 320 trailing the direction of travel. For example, still referring to FIG. 2 the bot 110M may be designated to transfer a case unit to the right side 261 of picking aisle 130A4. However, when travelling along any one of the guide lines 130L1-130L4 if the bot were to turn onto guide line 130S4 for transitioning into the picking aisle 130A4 with the front end 320 leading the direction of travel the transfer arm extension would be located on the wrong side of the aisle. It is noted that the bot could be fitted with any suitable device such as a turntable that could pivot or rotate the bot's payload bed within the bot allowing for the extension arms of the bot to be positioned for extension/retraction on the correct side of the aisle. The bot 110M may be configured so that the bot 110M travels past the picking aisle 130A4 along, for example, guide line 130L4. Any suitable bot collision avoidance or other traffic management may allow the bot 110M to travel in the direction of arrow 271 (e.g. substantially opposite the direction of the general traffic flow along guide path 130L4 as indicated by arrow 298) so that the bot can enter the picking aisle, in a manner substantially similar to that described above, with the back end 321 leading the direction of travel (e.g. the front end 320 trailing the direction of travel). As may be realized the guide members 500, 501 (FIG. 5) may be configured to guide the bot 110M into the picking aisle 130A4 with the bot travelling forwards (with the front end leading the direction of travel) or backwards (with the back end leading the direction of travel) where the interaction between the substantially fixed guide wheels 351, 354 and substantially compliant guide wheels 352, 353 and the guide members 500, 501 occurs in a manner substantially similar to that described above. It is noted that the arrangement of the fixed guide wheels 351, 354 and the substantially compliant guide wheels 352, 353 may be such that the substantially fixed guide wheels are located on the inside of the bot turns when entering, for example, the picking aisles (and/or the bot stations as described below).

As may be realized, the bots exiting the picking aisles may do so with either the front end 320 leading or trailing the direction of travel. For example, where each picking aisle 130A has a single lane of travel the bot may exit the picking aisle in the opposite orientation in which the bot entered the picking aisle. For example, bot 110M may enter picking aisle 130A4 with the back end 321 leading the direction of travel as described above and may exit the picking aisle 130A4 with the front end leading the direction of travel.

In the embodiments the bot station 140 may be in the form of a vestibule 130V that extends between the transfer deck 130B and the multilevel vertical conveyor 150. Each vestibule 130V may be configured with more than one charging/transfer station 290A, 290B (generally referred to herein as stations). Each of the stations 290A, 290B may be configured to charge an electricity storage device of the bot as well as serve as a transfer location for accessing a respective portion of the multilevel vertical conveyor shelf 250. The stations 290A, 290B may be arranged in, for example, a linear array, along guide line 130C2. It is noted that there may be any suitable number of stations having any suitable arrangement within the vestibule 130V. To allow the bots 110 access to each of the stations 290A, 290B the guide lines 130C1-130C3 of the vestibule 130V may be configured to allow bidirectional travel of the bots 110 (in combination with, for example, suitable bot traffic management).

In one example, general travel through the vestibule 130V may be such that the bots 110 enter the vestibule on guide line 130C3, travel through the vestibule along guide line 130C2 and exit the vestibule along guide line 130C1. The bot 110Y may be designated for transferring a case unit to the multilevel vertical conveyor 150 at station 290A. However, a bot 110X may be located at station 290B blocking access to the station 290A along the general direction of travel through the vestibule 130V. The bot 110Y may travel along guide line 130L1 in the direction of arrow 299 past vestibule guide line 130C1. The bot may turn onto the guide line 130C1 and enter the vestibule with the back end leading the direction of travel in a manner substantially similar to that described above with respect to bot 110M entering picking aisle 130A4. It is noted that in the embodiments the entrances/exits of the vestibule 130V may include guide members substantially similar to guide members 500, 501 described above with respect to FIG. 5 such that the guide members 500, 501 assist, for example, the line following of the bot. In alternate embodiments the entrances/exits of the vestibule 130V may lack guide members such that transition into the vestibule occurs through line following. Once on the guide line 130C1 the bot may travel and turn on to guide line 130C2 for arriving at station 290A so that a transfer of case unit 101 may be made between the bot 110Y and the multilevel vertical conveyor 150.

Similarly, if bot 110X completes the transfer of case unit 101 at station 290B while bot 110Y is located at station 290A the exit of the vestibule (as determined from the general flow of traffic through the vestibule described above) may be blocked. The bot 110X may travel with the back end 321 leading the direction of travel so that the bot 110X exits the vestibule along guide line 130C3. It is noted that the vestibule, such as vestibule 130V may include multiple substantially parallel paths or guide lines 130C3, 130C4 through the vestibule where shunts 130S traverse the paths 130C3, 130C4. The bots 110 may use these parallel paths 130C3, 130C4 and shunts 130S to travel around bots located at one or more of the stations 290A, 290B for accessing a desired one of the (unoccupied) stations 290A, 290B.

In a first aspect of the disclosed embodiment an autonomous transport vehicle is provided. The autonomous transport vehicle includes a frame having a longitudinal axis extending from a front of the frame to a back of the frame, at least one first guide member mounted on one side of the frame and having a first guide member frame of reference, and at least one second guide member mounted to an opposite side of the frame than the at least one first guide member and having a second guide member frame of reference, wherein the first and second guide members are asymmetrically compliant guide members so that a stiffness of the at least one first guide member in response to a force in a predetermined direction relative to the first guide member frame of reference is different than a stiffness of the at least second guide member in response to the force in the predetermined direction relative to the second guide member frame of reference.

In accordance with a first sub-aspect of the disclosed embodiment, the at least one first guide member includes a first yoke pivotally mounted to the frame about a first pivot member and a first engagement member mounted to the first yoke, and the at least one second guide member includes a second yoke pivotally mounted to the frame about a second pivot member and a second engagement member mounted to the second yoke.

In accordance with the first sub-aspect of the first aspect of the disclosed embodiment, the first engagement member is longitudinally offset from the first pivot member.

In accordance with the first sub-aspect of the first disclosed embodiment, the second engagement member is transversely aligned with the second pivot member.

In accordance with the first aspect of the disclosed embodiment one or more of the at least one first and at least one second guide members comprise rotatable wheels.

In accordance with the first aspect of the disclosed embodiment, the at least one first guide member comprises two first guide members and the at least one second guide member comprises two second guide members, the two first guide members being located on a first side of the autonomous transport vehicle and the two second guide members being located on a second opposite side of the autonomous transport vehicle.

In accordance with the first aspect of the disclosed embodiment, the autonomous transport vehicle is configured for transporting item between the autonomous transport vehicle and storage shelves of a storage and retrieval system and the at least one second guide member is configured to maintain a predetermined transverse distance between the autonomous transport vehicle and the items stored on the storage shelves.

In accordance with a second sub-aspect of the first aspect of the disclosed embodiment, the at least one first and at least one second guide members are configured to interface with a first guide rail and a second guide rail of a storage and retrieval system where the first and second guide rails are located on opposite sides of the autonomous transport vehicle for guiding the autonomous transport vehicle along a substantially straight path.

In accordance with the second sub-aspect of the first aspect of the disclosed embodiment one of the at least one first and at least one second guide members is configured to engage one of the first and second guide rails such that another one of the at least one first and at least one second guide member is held against another one of the first and second guide rails.

In accordance with the second sub-aspect of the first aspect of the disclosed embodiment the at least one first and at least second guide members are configured to interface with a first and second contoured guide members extending from respective ones of the first and second guide rails where the first and second contoured guide members have opposing contours for directing a respective one of the at least first guide member and the at least second guide member into engagement with a respective one of the first and second guide rails.

In accordance with a third sub-aspect of the first aspect of the disclosed embodiment, the autonomous transport vehicle is configured to travel along at least picking aisles of a storage and retrieval system and the at least one first guide member and the at least one second guide member are configured such that the autonomous transport vehicle can enter the picking aisles with the front of the autonomous transport vehicle leading or trailing a direction of travel of the autonomous transport vehicle.

In accordance with the third sub-aspect of the first aspect of the disclosed embodiment, the storage and retrieval system further includes a conveyor interface section, the at least one first guide member and the at least one second guide member are configured such that the autonomous transport vehicle can enter the conveyor interface section with the front of the autonomous transport vehicle leading or trailing a direction of travel of the autonomous transport vehicle.

In accordance with a second aspect of the disclosed embodiment, an automated transport vehicle is provided for transporting items in a storage and retrieval system where the storage and retrieval system includes picking aisles adjacent item storage locations. The automated transport vehicle includes a frame having a front end, a back end and a longitudinal axis extending between the front and back ends. A pair of first guide members are located on a first side of the frame where one of the first guide members is located adjacent the front end and the other of the first guide members is located adjacent the back end, each guide member of the pair of first guide members having a first guide member frame of reference. A pair of second guide members are located on a second side of the frame, opposite the first side, where one of the second guide members is located adjacent the front end and the other of the second guide members is located adjacent the back end, each guide member of the pair of second guide members having a second guide member frame of reference. The pair of first guide members and the pair of second guide members are asymmetrically compliant so that a stiffness of each one of the pair of first guide members in response to a force in a predetermined direction relative to a respective first guide member frame of reference is different than a stiffness of each one of the pair of second guide members in response to the force in the predetermined direction relative to a respective second guide member frame of reference.

In accordance with the second aspect of the disclosed embodiment each guide member of the pair of first guide members are configured to pivot relative to the frame when a resultant force applied to the guide wheel is at an angle relative to the longitudinal axis.

In accordance with the second aspect of the disclosed embodiment the pair of first guide members is configured to maintain the autonomous transport vehicle at a predetermined distance within the picking aisles from items in the storage locations.

In accordance with the second aspect of the disclosed embodiment, the pair of first guide members and the pair of second guide members are configured to allow the autonomous transport vehicle to traverse the picking aisle with either the front end or back end leading a direction of travel through the picking aisle.

In accordance with the second aspect of the disclosed embodiment, the storage and retrieval system further includes conveyor interface sections and the pair of first guide members and the pair of second guide members are configured to allow the autonomous transport vehicle to traverse the conveyor interface section with either the front end or back end leading a direction of travel through the conveyor interface section.

In accordance with a third aspect of the disclosed embodiment a storage and retrieval system is provided. The storage and retrieval system includes a transfer deck, picking aisles in communication with the transfer deck, and at least one autonomous transport vehicle configured to traverse the transfer deck and picking aisles. The at least one autonomous transport vehicle having a frame with a front end and a back end and a longitudinal axis extending between the front and back ends and at least one first guide member disposed on a first side of the frame and at least one second guide member disposed on a second opposite side of the frame where the at least one first guide member and the at least one second guide member are asymmetrically compliant so that a stiffness of the at least one first guide member in response to a force in a predetermined direction relative to the first guide member frame of reference is different than a stiffness of the at least second guide member in response to the force in the predetermined direction relative to the second guide member frame of reference.

In accordance with the third aspect of the disclosed embodiment, the at least one first guide member includes at least one first guide wheel and a first pivot member rotatably mounted to the frame and the at least one second guide member includes at least one second guide wheel and a second pivot member rotatably mounted to the frame, the at least one first guide wheel being rotatably mounted to the first pivot member where an axis of rotation of the first pivot member is located transversely in-line with a rotation axis of the at least one first guide wheel, and the at least one second guide wheel is rotatably mounted to the second pivot member where an axis of the second pivot member is longitudinally spaced from an axis of rotation of the at least one second guide wheel.

In accordance with the third aspect of the disclosed embodiment, the storage and retrieval system further includes conveyor interface sections having two transfer deck interfaces with the transfer deck configured for autonomous transport vehicle entry/exit to/from the conveyor interface sections and the autonomous transport vehicle is configured to one or more of enter/exit the two transfer deck interfaces with either of the front and back ends leading a direction of travel through the conveyor interface section and enter/exit and traverse the picking aisles with either of the front and back ends leading a direction of travel through the storage location picking aisles.

In accordance with a fourth aspect of the disclosed embodiment a storage and retrieval system is provided. The storage and retrieval system includes storage locations, at least one picking aisle configured to provide access to each of the storage locations, a transfer deck configured to allow substantially mechanically unconstrained travel of at least one autonomous transport vehicle on the transfer deck, and a vehicle guide system configured to at least guide a transition of the at least one autonomous transport vehicle from substantially mechanically unconstrained travel on the transfer deck to substantially mechanically constrained travel within the at least one picking aisle.

In accordance with the a first sub-aspect of the fourth aspect of the disclosed embodiment, the vehicle guide system includes at least one curved restraint disposed on at least one side of each of the at least one picking aisle at a junction between the transfer deck and a respective picking aisles, where the at least one curved restraint is configured to interface with guiding members of the autonomous transport vehicle for guiding the autonomous transport vehicle into the picking aisle.

In accordance with first sub-aspect of the fourth aspect of the disclosed embodiment, the vehicle guide system further includes at least one substantially linear guide member disposed on at least one side of each picking aisle where the at least one substantially linear guide member substantially extends from a respective one of the at least one curved restraint.

In accordance with the first sub-aspect of the fourth aspect of the disclosed embodiment, the at least one curved restraint includes a pair of converging restraints disposed on opposite sides of the respective picking aisle where the pair of converging constraints converges towards an entrance of the picking aisle. The vehicle guide system further includes a pair of substantially linear guide member disposed on opposite sides of respective picking aisle where each substantially linear guide member extends from a respective one of the converging restraints.

It should be understood that the exemplary embodiments disclosed herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An autonomous transport vehicle comprising:
  a frame having a longitudinal axis extending from a front of the frame to a back of the frame;

at least one first guide member mounted on one side of the frame and having a first guide member frame of reference; and at least one second guide member mounted to an opposite side of the frame than the at least one first guide member and having a second guide member frame of reference;

wherein the first and second guide members are asymmetrically compliant guide members so that a stiffness of the at least one first guide member in response to a force in a predetermined direction relative to the first guide member frame of reference is different than a stiffness of the at least second guide member in response to the force in the predetermined direction relative to the second guide member frame of reference and a stiffness of the at least one first guide member at a respective guide surface in response to a force in a different predetermined direction relative to the first guide member frame of reference is the same as a stiffness of the at least one second guide member at a respective guide surface in response to the force in the different predetermined direction relative to the second guide member frame of reference.

2. The autonomous transport vehicle of claim 1, wherein the at least one first guide member includes a first yoke pivotally mounted to the frame about a first pivot member and a first engagement member mounted to the first yoke, and the at least one second guide member includes a second yoke pivotally mounted to the frame about a second pivot member and a second engagement member mounted to the second yoke.

3. The autonomous transport vehicle of claim 2, wherein the first engagement member is longitudinally offset from the first pivot member.

4. The autonomous transport vehicle of claim 2, wherein the second engagement member is transversely aligned with the second pivot member.

5. The autonomous transport vehicle of claim 1, wherein one or more of the at least one first and at least one second guide members comprise rotatable wheels.

6. The autonomous transport vehicle of claim 1, wherein the at least one first guide member comprises two first guide members and the at least one second guide member comprises two second guide members, the two first guide members being located on a first side of the autonomous transport vehicle and the two second guide members being located on a second opposite side of the autonomous transport vehicle.

7. The autonomous transport vehicle of claim 1, wherein the autonomous transport vehicle is configured for transporting items between the autonomous transport vehicle and storage shelves of a storage and retrieval system and the at least one second guide member is configured to maintain a predetermined transverse distance between the autonomous transport vehicle and the items stored on the storage shelves.

8. The autonomous transport vehicle of claim 1, wherein further the at least one first and at least second guide members are configured to interface with a first guide rail and a second guide rail of a storage and retrieval system where the first and second guide rails are located on opposite sides of the autonomous transport vehicle for guiding the autonomous transport vehicle along a substantially straight path.

9. The autonomous transport vehicle of claim 8, wherein one of the at least one first and at least one second guide members is configured to engage one of the first and second guide rails such that another one of the at least one first and at least one second guide member is held against another one of the first and second guide rails.

10. The autonomous transport vehicle of claim 8, wherein the at least one first and at least second guide members are configured to interface with a first and second contoured guide members extending from respective ones of the first and second guide rails where the first and second contoured guide members have opposing contours for directing a respective one of the at least first and the at least second guide members into engagement with a respective one of the first and second guide rails.

11. The autonomous transport vehicle of claim 1, wherein the autonomous transport vehicle is configured to travel along at least picking aisles of a storage and retrieval system and the at least one first guide member and the at least one second guide member are configured such that the autonomous transport vehicle can enter the picking aisles with the front of the autonomous transport vehicle leading or trailing a direction of travel of the autonomous transport vehicle.

12. The autonomous transport vehicle of claim 1, wherein the storage and retrieval system further includes a conveyor interface section, the at least one first guide member and the at least one second guide member are configured such that the autonomous transport vehicle can enter the conveyor interface section with the front of the autonomous transport vehicle leading or trailing a direction of travel of the autonomous transport vehicle.

13. An automated transport vehicle for transporting items in a storage and retrieval system where the storage and retrieval system includes picking aisles adjacent item storage locations, the automated transport vehicle comprises:

a frame having a front end, a back end and a longitudinal axis extending between the front and back ends;

a pair of first guide members are located on a first side of the frame where one of the first guide members is located adjacent the front end and the other of the first guide members is located adjacent the back end, each guide member of the pair of first guide members having a first guide member frame of reference; and a pair of second guide members are located on a second side of the frame, opposite the first side, where one of the second guide members is located adjacent the front end and the other of the second guide members is located adjacent the back end, each guide member of the pair of second guide members having a second guide member frame of reference;

wherein the pair of first guide members and the pair of second guide members are asymmetrically compliant so that a stiffness of each one of the pair of first guide members in response to a force in a predetermined direction relative to a respective first guide member frame of reference is different than a stiffness of each one of the pair of second guide members in response to the force in the predetermined direction relative to a respective second guide member frame of reference and a stiffness of the at least one first guide member at a respective guide surface in response to a force in a different predetermined direction relative to the first guide member frame of reference is the same as a stiffness of the at least one second guide member at a respective guide surface in response to the force in the different predetermined direction relative to the second guide member frame of reference.

14. The automated transport vehicle of claim 13, wherein each guide member of the pair of first guide members are configured to pivot relative to the frame when a resultant force applied to the guide wheel is at an angle relative to the longitudinal axis.

15. The automated transport vehicle of claim 13, wherein the pair of first guide members is configured to maintain the autonomous transport vehicle at a predetermined distance within the picking aisles from items in the storage locations.

16. The automated transport vehicle of claim 13, wherein the pair of first guide members and the pair of second guide members are configured to allow the autonomous transport vehicle to traverse the picking aisle with either the front end or back end leading a direction of travel through the picking aisle.

17. The automated transport vehicle of claim 13, wherein the storage and retrieval system further includes conveyor interface sections and the pair of first guide members and the pair of second guide members are configured to allow the autonomous transport vehicle to traverse the conveyor interface section with either the front end or back end leading a direction of travel through the conveyor interface section.

18. A storage and retrieval system comprising:
   a transfer deck;
   picking aisles in communication with the transfer deck; and
   at least one autonomous transport vehicle configured to traverse the transfer deck and picking aisles, the at least one autonomous transport vehicle having
      a frame with a front end and a back end and a longitudinal axis extending between the front and back ends, and
      at least one first guide member disposed on a first side of the frame and at least one second guide member disposed on a second opposite side of the frame where the at least one first guide member and the at least one second guide member are asymmetrically compliant so that a stiffness of the at least one first guide member in response to a force in a predetermined direction relative to the first guide member frame of reference is different than a stiffness of the at least second guide member in response to the force in the predetermined direction relative to the second guide member frame of reference and a stiffness of the at least one first guide member at a respective guide surface in response to a force in a different predetermined direction relative to the first guide member frame of reference is the same as a stiffness of the at least one second guide member at a respective guide surface in response to the force in the different predetermined direction relative to the second guide member frame of reference.

19. The storage and retrieval system of claim 18, wherein the at least one first guide member includes at least one first guide wheel and a first pivot member rotatably mounted to the frame and the at least one second guide member includes at least one second guide wheel and a second pivot member rotatably mounted to the frame, the at least one first guide wheel being rotatably mounted to the first pivot member where an axis of rotation of the first pivot member is located transversely in-line with a rotation axis of the at least one first guide wheel, and the at least one second guide wheel is rotatably mounted to the second pivot member where an axis of rotation of the second pivot member is longitudinally spaced from an axis of rotation of the at least one second guide wheel.

20. The storage and retrieval system of claim 18, wherein the storage and retrieval system further includes conveyor interface sections having two transfer deck interfaces with the transfer deck configured for autonomous transport vehicle entry/exit to/from the conveyor interface sections and the autonomous transport vehicle is configured to one or more of enter/exit the two transfer deck interfaces with either of the front and back ends leading a direction of travel through the conveyor interface section and enter/exit and traverse the picking aisles with either of the front and back ends leading a direction of travel through the storage location picking aisles.

\* \* \* \* \*